(12) United States Patent
Rohaly et al.

(10) Patent No.: US 12,332,046 B2
(45) Date of Patent: Jun. 17, 2025

(54) FLUID TACTILE SENSORS

(71) Applicant: GelSight, Inc., Waltham, MA (US)

(72) Inventors: Janos Rohaly, Concord, MA (US); Micah Kimo Johnson, Nashua, NH (US); Youssef Benmokhtar Benabdellah, Boston, MA (US); Jay William Anseth, Canton, MA (US)

(73) Assignee: GelSight, Inc., Waltham, MA (US)

( * ) Notice: Subject to any disclaimer, the term of this patent is extended or adjusted under 35 U.S.C. 154(b) by 200 days.

(21) Appl. No.: 18/111,556

(22) Filed: Feb. 18, 2023

(65) Prior Publication Data

US 2023/0266120 A1   Aug. 24, 2023

Related U.S. Application Data

(60) Provisional application No. 63/311,568, filed on Feb. 18, 2022.

(51) Int. Cl.
*G01B 13/16* (2006.01)
*G01B 11/30* (2006.01)
*H04N 23/56* (2023.01)

(52) U.S. Cl.
CPC ............ *G01B 11/303* (2013.01); *G01B 13/16* (2013.01); *H04N 23/56* (2023.01)

(58) Field of Classification Search
CPC .... G01B 11/303; G01B 13/16; G01B 11/007; G01B 11/24; H04N 23/56; B25J 13/084; G01L 1/24; G01L 5/226
See application file for complete search history.

(56) References Cited

U.S. PATENT DOCUMENTS

| | | | |
|---|---|---|---|
| 2006/0254343 A1* | 11/2006 | Saxena | G01N 21/6486 73/53.01 |
| 2009/0195882 A1* | 8/2009 | Bolle | G02B 3/14 359/665 |
| 2013/0033595 A1 | 2/2013 | Adelson et al. | |
| 2015/0241608 A1* | 8/2015 | Shian | G02B 3/14 359/666 |
| 2017/0165792 A1* | 6/2017 | Buller | B29C 64/214 |

FOREIGN PATENT DOCUMENTS

| | | |
|---|---|---|
| WO | WO-2022025894 | 2/2022 |
| WO | WO-2023158840 | 8/2023 |

OTHER PUBLICATIONS

ISA/EP, "PCT Application No. PCT/US23/13386 International Search Report and Written Opinion mailed Jun. 2, 2023", , 14 pages.
Berselli, Giovanni et al., "Engineering Design of Fluid-Filled Soft Covers for Robotic Contact Interfaces: Guidelines, Nonlinear Modeling, and Experimental Validation", IEEE Transactions on Robotics, vol. 27, No. Jun. 3, 2011 , 14 Pages.
Alspach, A. et al., "Soft-bubble: A highly compliant dense geometry tactile sensor for robot manipulation", https://arxiv.org/abs/1904.02252, Apr. 3, 2019 , 8 Pages.
Kuppuswamy, N. et al., "Soft-bubble grippers for robust and perceptive manipulation", arXiv:2004.03691v2, Apr. 28, 20 , 8 Pages.
WIPO, , "PCT Application No. PCT/US23/13386 International Preliminary Report on Patentability mailed Aug. 29, 2024", 11 pages.

* cited by examiner

*Primary Examiner* — Abdullahi Nur
(74) *Attorney, Agent, or Firm* — Strategic Patents, P.C.

(57) ABSTRACT

A topographical measurement system may include a tactile sensor using a contained fluid as an imaging medium.

20 Claims, 5 Drawing Sheets

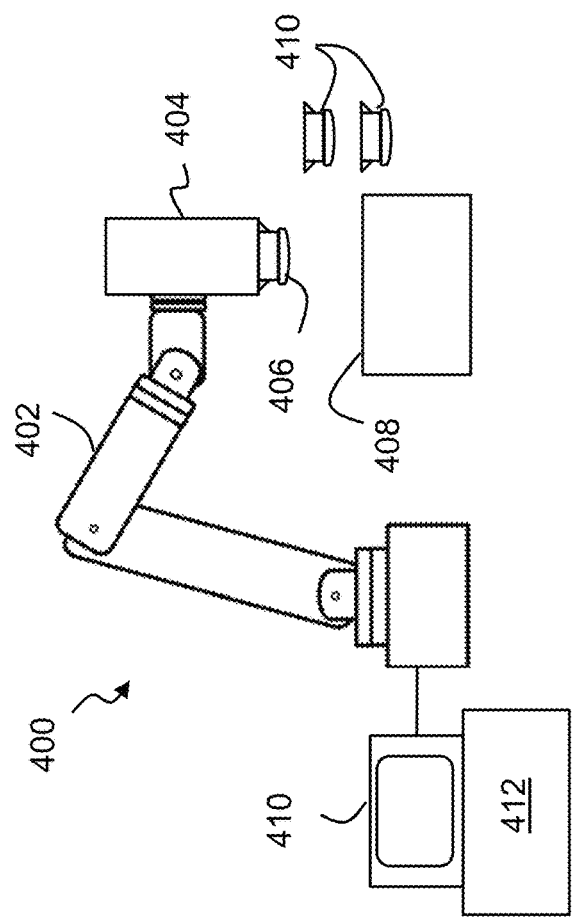
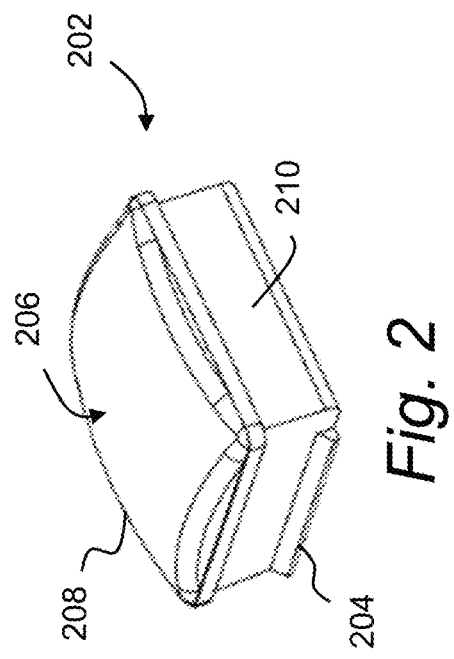
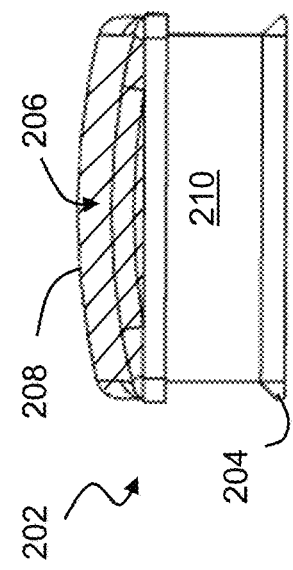
Fig. 4
Fig. 2
Fig. 3

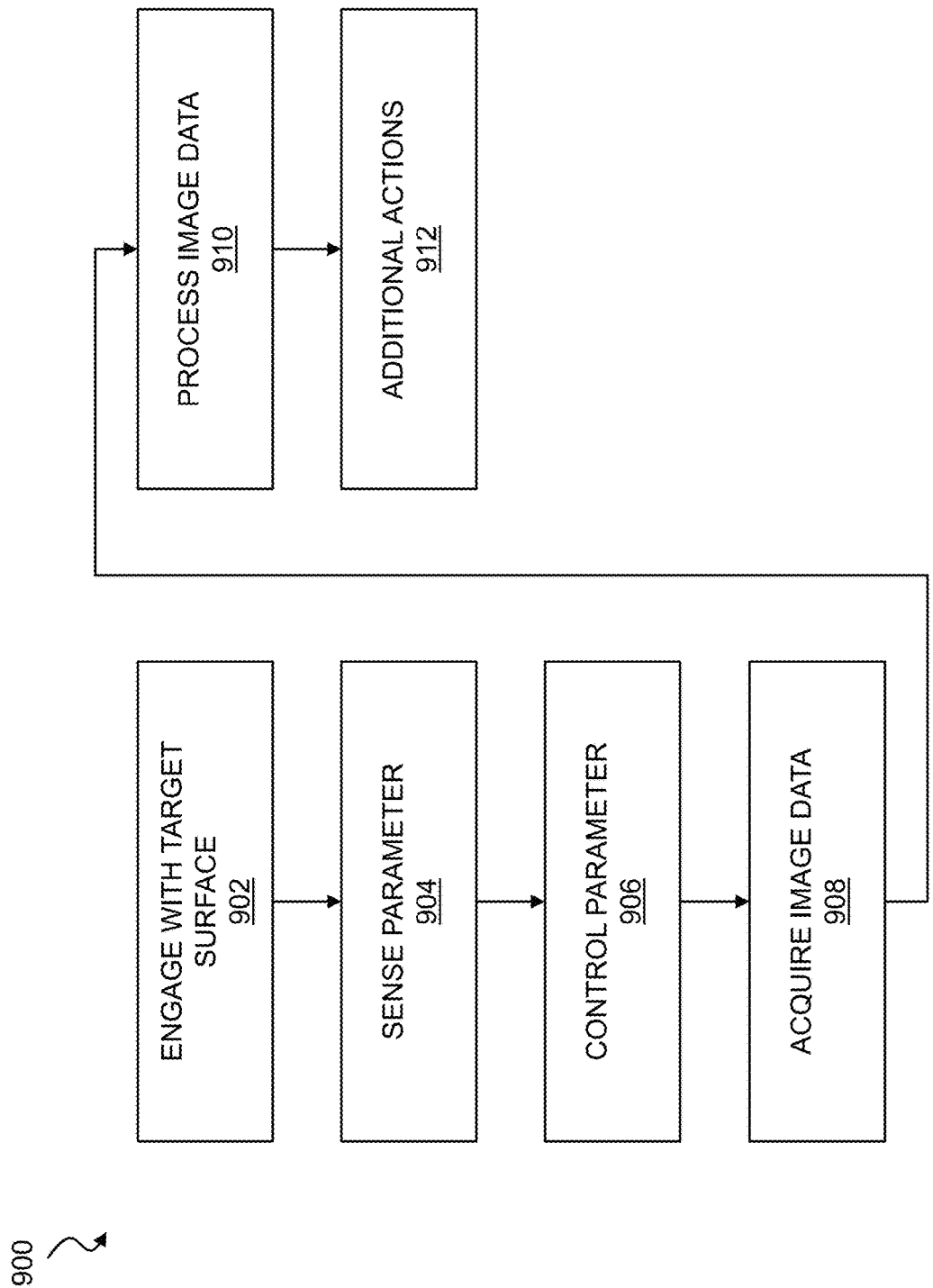

FLUID TACTILE SENSORS

RELATED APPLICATIONS

This application claims the benefit of U.S. Prov. App. No. 63/311,568 filed on Feb. 18, 2022, the entire content of which is hereby incorporated by reference.

TECHNICAL FIELD

The present disclosure generally relates to tactile sensing systems.

BACKGROUND

A variety of contact-based sensors are known in the art, and described for example in U.S. Pat. No. 8,411,140 issued on Apr. 2, 2013, U.S. Pat. No. 9,127,938, issued on Sep. 8, 2015, U.S. Pat. No. 10,965,854, issued on Mar. 30, 2021, and PCT App. No. US2022/046129. The entire content of each of the foregoing applications is hereby incorporated by reference. While such sensors provide a useful technique for contact-based acquisition of high resolution surface data, there remains a need for improved surface topography measurement systems using tactile sensors containing a fluid medium.

SUMMARY

A topographical measurement system includes a tactile sensor using a contained fluid as an imaging medium.

In one aspect, a system described herein includes a fluid tactile sensor including: a substrate, the substrate formed of a rigid material and the substrate including a window of optically transparent material, a membrane, the membrane formed of a flexible, elastic sheet of a material, and the membrane having a surface, a reservoir having a volume contained at least in part within the substrate and the membrane, and an imaging medium within the reservoir, the imaging medium including an optically transparent fluid; and an imaging system including: an illumination source directed through the window of the substrate toward the surface of the membrane when the membrane is positioned for use within an imaging volume of the imaging system, and an imaging device positioned to capture images of the surface of the membrane through the window of the substrate when the membrane is placed for use within the imaging volume of the imaging system.

The system may include a processor configured by computer executable code stored in a memory to acquire images from the imaging system and to calculate a quantitative surface topography of a target surface contacting the membrane. The illumination source may include a structured light source. The structured light source may create a three-dimensional illumination pattern within the imaging volume of the reservoir. The system may include a cartridge housing the fluid tactile sensor, the cartridge removable from and replaceable to the imaging system. The system may include one or more containing walls mechanically coupling the membrane to the substrate. The window may include at least one of a glass, a polycarbonate, an acrylic, a polystyrene, a polyurethane, or an optically transparent epoxy. The window may have a first index of refraction matched to a second index of refraction of the imaging medium within the reservoir. The imaging medium may include at least one of a gas and a liquid. The membrane may be formed of an elastic polymer. The system may include an optical pattern on the membrane visible to the imaging device of the imaging system through the window. The illumination source may include at least one of a laser and a light emitting diode. The imaging system may use two or more imaging modalities including at least one of photometric stereo imaging, multi-view stereo imaging, structured light imaging, and focus stacking. The system may include a pressure sensor coupled to the reservoir and configured to measure a pressure of the imaging medium within the reservoir.

In another aspect, a tactile sensor disclosed herein includes a substrate including a window of a rigid, optically transparent material; a membrane formed of a flexible material, the membrane coupled to the substrate to form a reservoir visible through the window of the substrate; and an optically transparent fluid in the reservoir.

The optically transparent fluid may have a first index of refraction matched to a second index of refraction of the window to facilitate imaging of the membrane through the window. The membrane may have an optically reflective surface. The membrane may have a patterned surface. The membrane may have an exterior surface facing away from the window, the exterior surface including a friction-reducing coating. The window may include one or more light shaping features for at least one of filtering, polarizing, focusing, or diffusing light passing through the window.

In another aspect, there is disclosed herein a system comprising: a fluid tactile sensor including: a substrate, the substrate formed of a rigid material and the substrate including a window of an optically transparent material, a membrane, the membrane formed of a flexible, elastic sheet of a material, and the membrane having a surface, a reservoir having a volume contained within the substrate and the membrane, and an imaging medium within the reservoir, the imaging medium including an optically transparent fluid; a fluid management system including: a supply of the imaging medium, and a pump coupled in a fluid path between the supply of the imaging medium to the reservoir, the pump configured to controllably deliver the imaging medium from the supply to the reservoir; and an imaging system including: an illumination source directed through the window of the substrate toward the surface of the membrane when the membrane is positioned for use within an imaging volume of the imaging system, and an imaging device positioned to capture images of the surface of the membrane through the window of the substrate when the membrane is placed for use within the imaging volume of the imaging system.

The system may include one or more sensors for measuring a pressure of the imaging medium within the reservoir. The system may include a controller configured to operate the pump to transfer the imaging medium between the supply and the reservoir in response to a signal from the one or more sensors. The controller may be configured to operate the pump to maintain the pressure at a predetermined target pressure. The volume of the imaging medium may be held constant within the reservoir, and wherein the pressure may be measured with the one or more sensors and stored with one or more images captured by the imaging system for use in processing the one or more images. The fluid tactile sensor may include one or more containing walls that couple the substrate with the membrane to form the reservoir. The system may include one or more illumination sources positioned within the reservoir and directed toward the membrane. The window may have a first index of refraction matched to a second index of refraction of the imaging medium. The imaging device may include one or more cameras. The illumination source may include at least one of a laser and a light emitting diode. The imaging medium may include at least one of a gas and a liquid. The window may include at least one of a glass, a polycarbonate, an acrylic, a polystyrene, a polyurethane, or an optically transparent epoxy. The system may include one or more temperature sensors for monitoring a temperature of the imaging medium. The system may include a temperature controller operable by a controller to control the temperature of the imaging medium in response to a signal from the one or more temperature sensors. The membrane may have one or more optical properties that vary with a temperature of the membrane. The membrane may have one or more optical properties that vary with a deformation of the membrane. The membrane may be configured to sense one or more sensed parameters at a target surface contacted by the membrane. The imaging system may use two or more imaging modalities including at least one of photometric stereo imaging, multi-view stereo imaging, structured light imaging, and focus stacking. The membrane may have an optically reflective surface. The membrane may be optically clear at one or more wavelength ranges acquired by the imaging system.

In another aspect, a system disclosed herein includes a fluid tactile sensor including: a substrate, the substrate formed of a rigid material and the substrate including a window of an optically transparent material, a membrane, the membrane formed of a flexible, elastic sheet of a material, and the membrane having a surface, a reservoir having a volume contained within the substrate and the membrane, and an imaging medium within the reservoir, the imaging medium including an optically transparent fluid; a robotic handler coupled to the fluid tactile sensor; and an imaging system including: an illumination source directed through the window of the substrate toward the surface of the membrane when the membrane is positioned for use within an imaging volume of the imaging system, and an imaging device positioned to capture images of the surface of the membrane through the window of the substrate when the membrane is placed for use within the imaging volume of the imaging system.

The fluid tactile sensor may be removably and replaceably coupled to the robotic handler. The robotic handler may be configured to automatically remove the fluid tactile sensor and replace the fluid tactile sensor with a replacement sensor. The system may include a display presenting a visualization of at least one of a pressure field, a contact force field, and a surface topology acquired by the imaging system. The system may include a machine learning model configured to identify an object contacted by the fluid tactile sensor based on data acquired from the imaging system. The system may include a machine learning model configured to automatically select an action for the robotic handler to perform on a workpiece contacted by the fluid tactile sensor. The system may include a plurality of fluid tactile sensors arranged on a base and coupled to the robotic handler. The base may include a rigid substrate. The base may include a flexible substrate. The base may include an active substrate with a controllable shape. Each of the plurality of fluid tactile sensors may have a controllable pressure. The plurality of fluid tactile sensors are arranged in a two dimensional array for localized measurements across a two-dimensional target surface. The base may include one or more articulating joints. The one or more articulating joints may include at least one passive articulating joint. The one or more articulating joints may include at least one active articulating joint with a computer-controllable position or orientation. The system may include a processor configured by computer executable code stored in a memory to acquire images from the imaging system and to calculate a quantitative surface topography of a target surface contacting the membrane. The system may include a processor configured by computer executable code stored in a memory to acquire pressure data from a pressure sensor coupled to the reservoir, and in response to the pressure data, to provide a control signal to a pump to transfer fluid between the reservoir and a supply of the imaging medium. The system may include a processor configured by computer executable code stored in a memory to acquire temperature data from a temperature sensor coupled to the reservoir, and in response to the temperature data, to provide a control signal to a thermal controller to heat or cool the imaging medium. The imaging system may use two or more imaging modalities including at least one of photometric stereo imaging, multi-view stereo imaging, structured light imaging, and focus stacking. The window may have a first index of refraction matched to a second index of refraction of the imaging medium.

In another aspect, there is disclosed herein a system comprising: a fluid tactile sensor including: a substrate, the substrate formed of a rigid material and the substrate including a window of an optically transparent material, a membrane, the membrane formed of a flexible, elastic sheet of a material, and the membrane having a surface, a reservoir having a volume contained within the substrate and the membrane, an imaging medium within the reservoir, the imaging medium including an optically transparent fluid, and a plurality of beads within the reservoir, the beads formed of an optically transparent material index matched to the imaging medium within the reservoir for at least one range of wavelengths; a supply of the imaging medium; a pump; wherein the pump is coupled in fluid communication between the supply and the reservoir, and wherein the pump is configured to transfer the imaging medium between the reservoir and the supply; and an imaging system including: an illumination source directed through the window of the substrate toward the surface of the membrane when the membrane is positioned for use within an imaging volume of the imaging system, and an imaging device positioned to capture images of the surface of the membrane through the window of the substrate when the membrane is placed for use within the imaging volume of the imaging system.

The system may include a robotic handler coupled to the fluid tactile sensor. The fluid tactile sensor may be removably and replaceably coupled to a housing of the robotic handler. The system may include a processor configured by computer executable code to perform a soft robotic gripping function with the fluid tactile sensor. The system may include a robotic handler and a processor, the robotic handler coupled to the fluid tactile sensor, and the processor configured by computer executable code to perform the steps of: pressurizing the reservoir with the imaging medium to increase a malleability of the fluid tactile sensor; positioning the fluid tactile sensor on an object with the robotic handler; and gripping the object by depressurizing the reservoir to remove a portion of the imaging medium and increase a rigidity of the fluid tactile sensor over portion of the membrane engaged with the object. The processor may be further configured to acquire one or more images of the object through the window at the one or more ranges of wavelengths where the plurality of beads are optically transparent and index matched to the imaging medium. The system may include a processor configured by computer executable code stored in a memory to acquire images from the imaging system and to calculate a quantitative surface topography of a target surface contacting the membrane. The imaging medium may include a gas. The imaging medium may include a liquid. The illumination source may include at least one of a laser and a light emitting diode. The imaging system may use two or more imaging modalities including at least one of photometric stereo imaging, multi-view stereo imaging, structured light imaging, and focus stacking. The system may include a pressure sensor coupled to the reservoir and configured to measure a pressure of the imaging medium within the reservoir. The system may include a processor configured to control the pump in response to a signal received from the pressure sensor. The membrane may have at least one of an optically reflective surface and a patterned surface. The system may include a display presenting a visualization of at least one of a pressure field, a contact force field, and a surface topology acquired by the imaging system of an object contacting the membrane. The system may include a machine learning model configured to identify an object contacted by the fluid tactile sensor based on data acquired from the imaging system. The window may include at least one of a glass, a polycarbonate, an acrylic, a polystyrene, a polyurethane, or an optically transparent epoxy. The window may have a first index of refraction matched to a second index of refraction of the imaging medium within the reservoir. The membrane may be formed of an elastic polymer. The system may include an optical pattern on a portion of the membrane facing the window.

BRIEF DESCRIPTION OF THE DRAWINGS

Embodiments of devices, systems, and methods described herein are shown in the following drawings. The drawings are not necessarily to scale, emphasis instead being placed upon illustrating the principles of this disclosure.

FIG. 2 is a perspective view of a tactile sensor.

FIG. 3 is a side view of the tactile sensor of FIG. 2.

FIG. 4 shows a robotic system using a tactile sensor.

FIG. 9 illustrates a method for using a fluid tactile sensor.

DETAILED DESCRIPTION

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

The devices, systems, and methods described herein may include, or may be used in conjunction with, the teachings of U.S. Pat. No. 8,411,140 issued on Apr. 2, 2013, U.S. Pat. No. 9,127,938, issued on Sep. 8, 2015, U.S. Pat. No. 10,965,854, issued on Mar. 30, 2021, and PCT App. No. US2022/046129. The entire contents of each of the foregoing is hereby incorporated by reference. In certain aspects, the devices, systems, and methods described herein may be used to provide readily interchangeable tactile sensors for handheld or quantitative topographical or three-dimensional measurement systems. The devices, systems, and methods described herein may also or instead be included on, or otherwise used with, other systems. For example, the systems described herein may be useful for, e.g., robotic end effector systems, such as for part identification and pose estimation, force feedback, robotic surgery, medical examination, and the like as well as other systems and applications where one or more of touch, tactile sensing, surface topography, or three-dimensional measurements are necessary or helpful.

Figure 1:
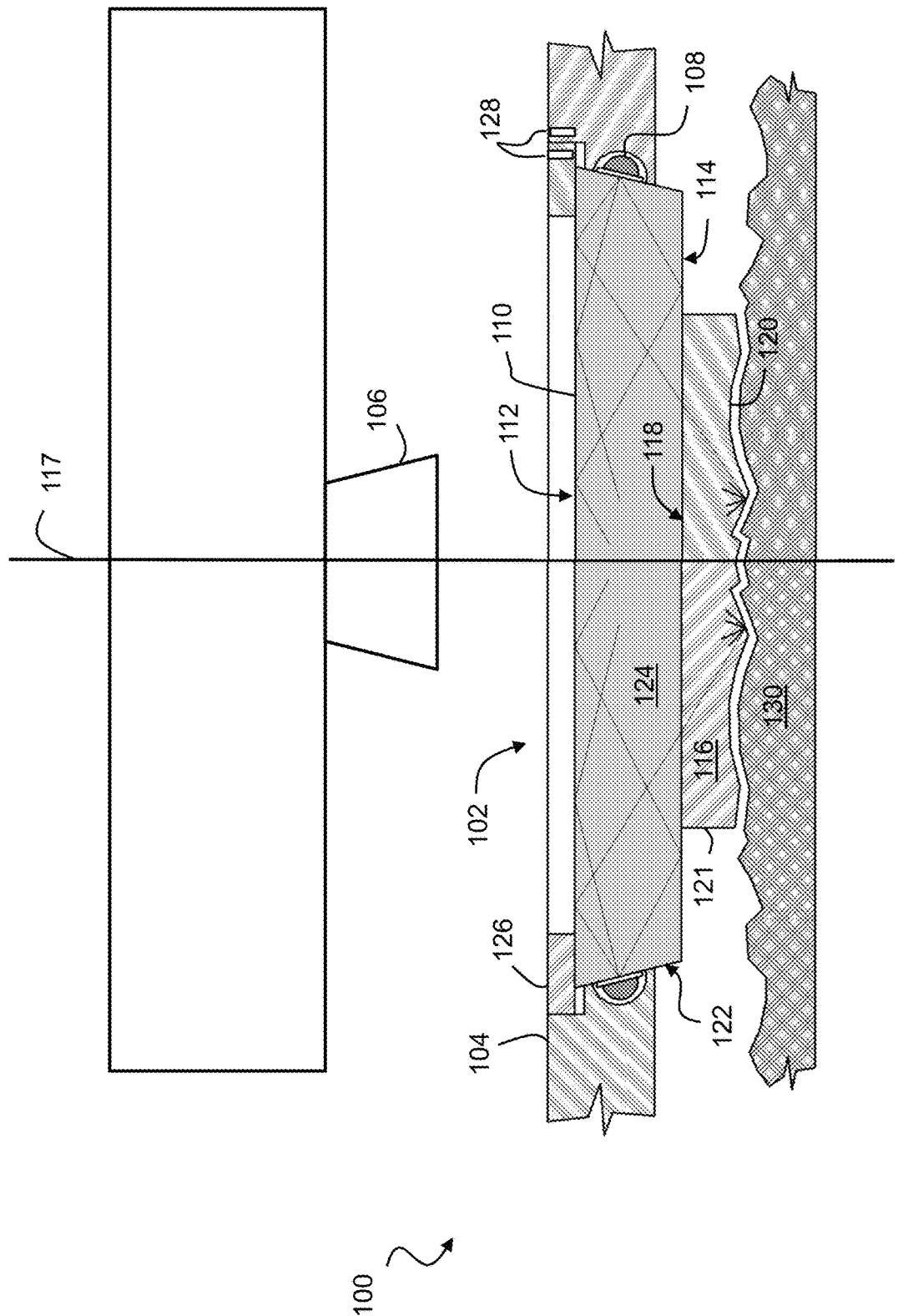
FIG. 1 shows an imaging system.

FIG. 1 shows an imaging system. In general, the imaging system 100 may be any system for quantitative or qualitative topographical measurements and/or visualization, such as any of those described in the documents identified above, and modified to provide a container for a fluid imaging medium as described herein. The imaging system may acquire quantitative data such as an image, a surface normal map, a height map of three-dimensional topography, a force map, an elasticity map, or other measure of softness/hardness of the target surface, and so forth. It will be understood that, while the term "imaging system" is used to describe some of the contemplated embodiments, a tactile sensor may also be deployed in systems that do not generate images, e.g., where raw sensor data is provided to a neural network or other machine learning system for decision making without converting the raw data into any image or quantitative surface reconstruction. All such permutations, combinations, or variations of the foregoing are intended to fall within the scope of this description, and within the scope of an imaging system as described herein, unless explicitly stated otherwise.

In one aspect, the imaging system 100 may include a tactile sensor 102 configured as a removable and replaceable cartridge for the imaging system 100, along with a fixture 104 for retaining the tactile sensor 102. The fixture 104 may have a predetermined geometric configuration relative to the imaging system 100, e.g., relative to an imaging device 106 such as a camera and an illumination source 108 such as one or more light emitting diodes or other light sources, so that the tactile sensor 102, when secured in the fixture 104, has a known position and orientation relative to the camera and light source(s). This enforced geometry advantageously permits re-use of calibration data for a tactile sensor 102, and reliable, repeatable positioning of the tactile sensor 102 within an optical train of the imaging system 100.

It should be appreciated that, while portions of the following description emphasize the use of a removable tactile sensor 102 configured as a cartridge or the like for modular use and reuse, the tactile sensor 102 or portions thereof may also or instead be integrated into the imaging system 100 in a generally non-removable manner. Thus, advantages of the systems and methods described herein may apply as well to an imaging system 100 that does not include a removable tactile sensor 102, but instead incorporates some or all of the components of the tactile sensor 102 into a body of the imaging system 100. Portions of the tactile sensor 102, such as a rigid substrate may also or instead be integrated into the body of the imaging system 100, while other portions such as a portion that contacts target surfaces or contains a fluid imaging medium may be removable and replaceable to permit reuse of the imaging system 100 after the contact surface has become contaminated or damaged with use.

The tactile sensor 102 may include an optical element 110 formed at least in part of a rigid, optically transparent material such as glass, polycarbonate, acrylic, polystyrene, polyurethane, an optically transparent epoxy, or any other material with suitable mechanical and optical properties for use in the systems described herein. In this context, and more generally as the term is used herein, it will be understood that "optically transparent" may mean generally clear within the visible light range, and can also or instead mean clear within a wavelength or range of wavelengths of interest. Thus, for example, where imaging is performed in the infrared range, a "clear" material will transmit most of the incident light in the infrared range. As another example, imaging may usefully be channelized or multiplexed using different ranges of wavelengths, and the optical element 110 may be clear for these aggregated ranges of wavelengths, or may include multiple components, each clear at one or more different ones of the wavelength ranges. It should also be understood that "clear," in this context means sufficiently transmissive to capture images. This may generally be understood as, e.g., greater than ninety percent transmissive, with less than ten percent combined reflection and absorption. However, optical elements 110 with transmissivity less than ninety percent may also be used, e.g., due to specific material or cost constraints, provided the optical element(s) 110 transmit sufficient light within wavelengths of interest to support imaging with the imaging system 100 as generally described herein.

In general, the optical element 110 may form a substrate for the tactile sensor 102, or the optical element 110 may be a window or the like within a larger mechanical substrate for the tactile sensor 102, i.e., where a window of optically clear material is embedded in another structure for attaching to the fixture 104 or other components of the imaging system 100. In one aspect, the optical element 110 may be formed of a silicone such as a hard platinum cured silicone, or any other optical quality polymer. The optical element 110 may include a first surface 112 including a region with an optically transparent surface for capturing images through the optical element 110, e.g., by the imaging device 106. The optical element 110 may also include a second surface 114 opposing the first surface 112, with a center axis 117 passing through the first surface 112 and the second surface 114.

In general, the first surface 112 may have optical properties suitable for conveying an image from the second surface 114 through the optical element 110 to the imaging device 106. To support this function, the first surface 112 may, for example, include a curvature providing a lens to optically magnify, focus, or otherwise modify an image from the second surface 114. For example, the first surface 112 may include an aspheric surface shaped to address spherical aberrations or other optical aberrations in an image captured through the optical element 110 from the second surface 114. The first surface 112 may also or instead include a freeform surface shaped to reduce or otherwise mitigate geometric distortion in an image captured through the optical element 110. Imaging through a thick medium may generally lead to spherical aberration with a magnitude depending on a numerical aperture of the imaging system 100 (or more specifically here, the imaging lens 106). Thus, the first surface 112 of the optical element 110 may be curved or otherwise adapted to address such spherical aberrations (and other higher order aberrations) resulting from propagation of focused ray bundles through thick media. More generally, the first surface 112 may include any shape or surface treatment suitable to focus, shape, or modify the image in a manner that supports capture of topographical data using the optical element 110. The second surface 114 may also or instead be modified to improve image capture. For example, the second surface 114 of the optical element 110 may include a convex surface extending from the optical element 110 (e.g., toward the target surface 130 being imaged) in order to magnify or otherwise shape an image conveyed from the target surface 130 to the imaging device 106. More generally, the first surface 112 may include any light shaping features such as filters, focusing curvatures, diffusers, and so forth, suitable for facilitating imaging as described herein.

The optical element 110 may generally serve a number of purposes in an imaging system 100 as contemplated herein. In one aspect, the optical element 110 serves as a rigid body to transfer pressure relatively uniformly across a target surface 130 when capturing images. Specifically, the body of the optical element 110 may apply a substantially uniform pressure on an imaging medium such that a reflective membrane coating on the other side of the imaging medium conforms to a measured surface topography. In one aspect, the optical element 110 may provide a grazing or shallow angle illumination, e.g., from illumination sources 108 on the edges thereof. The optical element 110 may also or instead provide directional dark field illumination. To this end, a sufficiently thick optical material may be used, and may function as a light guide to provide controlled, uniform, and to provide close to collimated dark field or grazing illumination of the reflective membrane surface from distinct directions (e.g., when a single LED segment of the illumination source 108 is on) or from all around (e.g., when all LED segments of the illumination source 108 are on). The latter configuration may be useful, for example, when different colored LEDs are used to multiplex optical channels for multi-spectral photometric stereo in which each color is associated with a specific illumination direction.

A fluid layer 116 such as an optically transparent fluid or other fluid imaging medium may be contained within the second surface 114 of the optical element 110, a membrane 120, and, where the membrane 120 is not fluidically sealed to the second surface 114, a containing wall 121 that couples the membrane 120 to the second surface 114 to contain the fluid layer 116 therebetween. In general, the fluid layer 116 may include any gas or other Newtonian or non-Newtonian fluid with suitable optical properties for imaging as describe herein. The fluid layer 116 may also be sufficiently malleable to permit the second surface 120 to conform to a target surface of interest. In general, a first side 118 of the fluid layer 116 that is adjacent to the second surface 114 of the optical element 110 may have an index of refraction that is matched to the index of refraction of the second surface 114. It will be appreciated that, as used herein when referring to indices of refraction, the term "matched" does not require identical indices of refraction. Instead, the term "matched" generally means having indices of refraction that are sufficiently close to transmit images through a corresponding interface between two materials for capture by the imaging device 106. Thus, for example, acrylic has an index of refraction of about 1.49 while polydimethylsiloxane has an index of refraction of about 1.41 and these materials are sufficiently matched that they can be placed adjacent to one another and can be used to transmit images sufficient for quantitative or qualitative topographical measurements as contemplated herein.

The membrane 120 containing the fluid layer 116 on a second side opposing the first side may conform to a target surface 130 while providing an internal surface (facing the imaging device 106) that facilitates topographical imaging and measurements by the imaging system 100. The membrane 120 may, for example, include an opaque and/or reflective coating, or more generally, any optical coating with a predetermined reflectance suitable for supporting topographical imaging as contemplated herein. In general, this coating can facilitate capture of images through the optical element 110 that are independent of optical properties of the target surface 130 such as color, translucence, gloss, specularity, and the like that might otherwise interfere with optical imaging. In one aspect, the membrane 120 may, in the absence of external forces, form a convex surface extending away from the optical element 110 and the containing wall 121 (e.g., toward the target surface 130). This geometric configuration can provide numerous advantages such as facilitating imaging of surfaces with large, aggregate concave shapes, and mitigating an accumulation of air bubbles within the field of view when the tactile sensor 102 is initially placed in contact with a target surface 130, e.g., by forming an initial contact near the center of a field of view that progresses outward and away from the center, permitting an evacuation of air, as additional force is applied to increase the contact area between the membrane 120 and the target surface 130.

In addition to the containing wall 121 around the fluid layer, a sidewall 122 may be formed around an interior 124 of the optical element 110 extending from the first surface 112 to the second surface 114. In general, the sidewall 122 may include one or more light shaping features configured to control an illumination of the second surface 114 through the sidewall 122, e.g., from the illumination source 108. Like the surfaces 112, 114 of the optical element 110, the sidewall 122 may assume a variety of geometries with useful light shaping features, e.g., to steer light at desirable angles and uniformity into and through the optical element 110. For example, the sidewall 122 may include a continuous surface forming a frustoconical shape between two circles formed in the first surface 112 and the second surface 114. The sidewall 122 may also or instead include a truncated hemisphere between some or all of the region between the first surface 112 and the second surface 114. In another aspect, the sidewall 122 may include two or more discrete planar surfaces arranged into a regular or irregular polygonal geometry such as a hexagon or an octagon about the center axis 117. In this later embodiment with planar surfaces, each such surface may have an illumination source 108 such as one or more light emitting diodes adjacent thereto in order to provide side lighting as desired through the optical element 110. It should be understood that a plane may also serve as a light shaping feature where the plane refracts light rays and/or otherwise controls illumination in a desired manner within an imaging volume of the system 100.

Other light shaping features may also or instead be used with the sidewall 122, e.g., to focus or steer incident light from the illumination source 108, or to control reflection of light within the optical element 110 and/or the layer 116 of optically transparent fluid. For example, the light shaping feature may include a diffusing surface to diffuse point sources of incoming light along the sidewall 122. This may, for example, help to diffuse light from individual light emitting diode elements in the illumination source 108, and/or to provide a more uniform illumination field from a planar surface of the sidewall 122. The sidewall 122 may also or instead include a polished surface to refract incoming light into the optical element 110. It will be appreciated that diffusing and reflecting surfaces may also be used in various combinations to generally shape illumination within the optical element 110. The sidewall 122 may also or instead include a curved surface, e.g., forming a lens within the sidewall 122 to focus or steer incident light into the optical element 110 as desired.

In another aspect, the sidewall 122 may include a neutral density filter with graduated attenuation to compensate for a distance from the sidewall 122. More specifically, in order to avoid over-illumination of regions of the second surface 118 near the sidewall 122, and/or under-illumination of regions of the second surface 118 away from the sidewall 122 (and closer to the center axis 117), the sidewall 122 may provide broadband attenuation with a neutral density filter that provides greater attenuation in areas of the sidewall 122 closer to the second surface 114 and less attenuation in areas of the sidewall 122 closer to the first surface 112. In this manner, light rays directly illuminating the second surface 114 at a downward angle adjacent to the sidewall 122 may be more attenuated than other light rays exiting the illumination source 108 toward the center of the second surface 114. This attenuation may, for example, be continuous, discrete, or otherwise graduated to provide generally greater attenuation closer to the sidewall 122 or otherwise balance illumination within the field of view.

In another aspect, the light shaping feature may include one or more color filters, which may usefully be employed, e.g., to correlate particular colors to particular directions of illumination within the optical element 110, or otherwise control use of colored illumination from the illumination source 108. Where the imaging system uses wavelength-multiplexed imaging, color filters on the sidewalls may also reduce stray lighting within the tactile sensor by selectively reflecting or transmitting frequency ranges of interest. In another aspect, the light shaping feature may include a non-normal angle of the sidewall 122 to the second surface 114. For example, as illustrate in FIG. 1, the sidewall 122 is angled away from the second surface 114 to form an obtuse angle therewith. This approach may advantageously support indirect illumination of the second surface 118, e.g., by total internal reflection of light off of the first surface 112 and into the optical element 110. In another aspect, the sidewall 122 may be angled toward the second surface to provide an acute angle therewith, e.g., in order to support greater direct illumination of the second surface 118. These approaches may be used alone or in combination to steer light as desired into and through the optical element 110.

The light shaping feature may also or instead include a geometric feature such as a focusing lens, planar regions, or the like to direct incident light as desired. Other optical elements may also or instead usefully be formed onto or into the sidewall 122. For example, the light shaping feature may include an optical film such as any of a variety of commercially available films for filtering, attenuating, polarizing, or otherwise shaping the incident light. The light shaping feature may also or instead include a micro-lens array or the like to steer or focus incident light from the illumination source 108. The light shaping feature may also or instead include a plurality of micro-replicated and/or diffractive optical features such as lenses, gratings, or the like. For example, a microstructured sidewall 122 may include, e.g., microimaging lenses, lenticulars, microprisms, and so on as light shaping features to steer light from the illumination source 108 into the optical element 110 in a manner that improves imaging of topographical variations to the imaging surface of the tactile sensor 102 on the second side 120 of the layer 116 of optically transparent fluid. For example, microstructured features may facilitate shaping the illumination pattern to provide uniform light distribution across the measured field, reduce the reflection of light back into or out of the optical element 110, and so forth. Microstructuring may, for example, be imposed during injection molding of the optical element 110, or by applying an optical film with the desired microstructure to the side surface. For example, a commercially suitable optical film may include Vikuiti™, an advanced light control film (ALCF) sold by 3M.

As noted above, one or more of these light shaping features may also or instead be integrated into the other surfaces 112, 118 of the imaging system 100, where they may be deployed to filter, focus, modulate, or otherwise modify illumination along the optical path from the illumination source 108 to the membrane 120 and/or back to the imaging device 106.

A mechanical key 126 may be disposed on an exterior of the optical element 110 for enforcing a predetermined position of the optical element 110 (and more generally, the tactile sensor 102) within the fixture 104 of the imaging system 100. The mechanical key 126 may, for example, include at least one radially asymmetric feature about the center axis 117 for enforcing a unique rotational orientation of the optical element 110 within the fixture 104 of the imaging system 100. The mechanical key 126 may include any number of mechanical elements or the like suitable for retaining the optical element 110 in a predetermined orientation within the imaging system 100. The mechanical key 126 may also or instead include a matched geometry between the optical element 110 and the fixture 104. For example, the mechanical key 126 may include a cylindrical structure extending from the optical element 110, or an elliptical prism or the like, which may usefully enforce a rotational orientation concurrently with position. A mechanically enforced position may be particularly advantageous in the context of a fluid tactile sensor where shape, thickness, elasticity, and optical properties of the containing membrane may vary among sensors, and across the fluid layer 116 for a particular sensor.

In one aspect, the mechanical key 126 may include one or more magnets 128 or other mechanism(s) to secure the optical element 110 in the fixture 104 of the imaging system 100. The magnets 128 may be further encoded via positioning and/or polarity to ensure that the optical element 110 is only inserted in a particular rotational orientation about the center axis 117. The mechanical key 126 may also or instead include a plurality of protrusions including at least one protrusion having a different shape than other ones of the plurality of protrusions for enforcing the unique rotational orientation of the optical element 110 about the center axis 117 within the fixture 104 of the imaging system 100. The mechanical key 126 may also or instead include at least three protrusions (e.g., exactly three protrusions) shaped and sized to form a kinematic coupling with the fixture 104 of the imaging system 100. The mechanical key 126 may also or instead include features such as a flange, a dovetail, or any other mechanical shapes or features to securely mate the optical element 110 to the fixture 104 in a predetermined position and/or orientation. A number of specific mechanical keying systems are discussed herein with reference to specific optical element designs and configurations.

Surfaces of the tactile sensor 102 may be further treated as necessary or helpful for use in an imaging system 100 as contemplated herein. For example, regions of the top, side, and bottom surfaces of the optical element 110 or other portions of the tactile sensor 102 may be covered with a light absorbing layer, such as a black paint, e.g., to contain light from the illumination source 108 or to reduce infiltration of ambient light.

In one aspect, the optical element 110 and the fluid layer 116 of the tactile sensor 102 may be formed as a cartridge that is provided for end users as an integral, removable, and replaceable device that can be quickly and easily replaced by an end user as required, e.g., due to wear in the membrane 120, or in order to substitute in a tactile sensor 102 with different optical properties, e.g., for a different imaging application, resolution, or the like.

In another aspect, the fluid layer 116 may have a variety of different surface shapes based on the shape and mechanical properties of the membrane 120, along with the volume of fluid in the fluid layer 116. For example, the membrane may form a convex surface shaped to provide a sensor that extends outward from the imaging system 100, and more specifically, the optical element 110 of the imaging system 100, which may advantageously facilitate imaging of relatively concave surfaces, and may also advantageously mitigate bubble formation when the fluid layer 116 is placed on a target surface for image capture.

FIG. 2 is a perspective view of a tactile sensor with a fluid imaging medium. The tactile sensor 202 may, for example, have a generally rectangular construction, and may include one or more flanges 204 or the like so that the tactile sensor 202 can linearly slide into engagement with a fixture of a housing. This type of engagement mechanism may be particularly suited to robotic applications or the like, such as where the tactile sensor 202 is removed from and replaced to an end effector of a robotic handler. The tactile sensor 202 may, for example, be any of the tactile sensors described herein. A fluid layer 206, such as any of the fluid layers described herein, may provide an optically transparent medium contained in part by a membrane 208 and in part by a substrate 210 of a rigid, optically clear material.

FIG. 3 is a side view of the tactile sensor of FIG. 2.

FIG. 4 shows a robotic system using a tactile sensor. In general, the system 400 may include a robotic handler 402 with a housing 404 on an end thereof that is configured to removably and replaceably receive a tactile sensor 406 such as a cartridge or any of the other tactile sensors or other optical devices described herein. In general, the robotic handler 402 may include any robotic component or combination of components suitable for positioning and manipulating objects. For example, the robotic handler 402 may include a robotic arm, a gantry, a SCARA robot, a Cartesian robot, a delta arm, or any combination of these or other positional controllers, along with suitable sensors, actuators and the like to control movement thereof. The robotic handler 402 may also include any suitable manipulators, grippers, end effectors or the like for grasping or otherwise handling and manipulating objects. The system 400 may also include a processor or other controller or the like for providing a programmatic or user interface to control operation of the robotic handler 402.

The robotic handler 402 may be configured to position the tactile sensor 406 in contact with a target surface 408 in order to capture topographical images of the target surface 408 using, e.g., a camera or other imaging device in the housing 404. It will be appreciated that components of such an imaging device may generally be within the housing 404, or positioned remotely and optically coupled, e.g., by optical fibers or the like, to the tactile sensor 406, or some combination of these. In one aspect, the system 400 may be configured, e.g., by computer executable code stored in a memory of the system 400 and executed by a processor of the system 400, to automatically remove the tactile sensor 406 from a fixture of the system 400 (e.g., in the housing 404), and to insert a second cartridge 410 with a replacement sensor into the housing 404. The second tactile sensor 410 may be the same as the tactile sensor 406, e.g., to provide a replacement after ordinary wear and tear, or the second tactile sensor 410 may have a different optical configuration than the first tactile sensor 406, e.g., to provide greater magnification, a larger field of view, better feature resolution, deep feature illumination, different aggregate surface shape, different shape tolerances for the target surface 408, and so forth. The second tactile sensor 410 may be stored in a bin or other receptacle accessible to the robotic handler 402 of the system 400. In general, the system 400 may include one or more magnets, electromechanical latches, actuators, and so forth, within the housing 404, or more generally within the system 400, to facilitate removal and replacement of the tactile sensor 406 as described herein. More generally, the system 400 may include any gripper, clamp, or other electromechanical end effector or the like suitable for removing and replacing the tactile sensor 406 and positioning the tactile sensor 406 for use in an imaging process.

In one aspect, the robotic handler 402 may be manually operated by a human technician from a console or the like. The robotic handler 402 may also or instead be programmed to operate automatically, e.g., in a testing or manufacturing facility. In this context, the robotic handler 402 may, for example, automatically position the tactile sensor 406 on a workpiece of interest using sensing networks, machine learning algorithms, and other techniques, and may, e.g., control contact force, fluid pressure, temperature, or other parameters in preparation for a measurement and/or while acquiring image data. After proper positioning, the robotic handler 402 may control an imaging system (also in the housing 404, or accessible therefrom) to acquire data for a three-dimensional reconstruction of a target surface of the workpiece. This general technique may be used, e.g., for parts inspection, metrology, and so forth.

In another aspect, the robotic handler 402 may use tactile feedback to guide decision-making. For example, the robotic handler 402 may determine whether the workpiece satisfies certain physical requirements, and may then sort the workpiece into acceptable, unacceptable, and/or requiring manual inspection. In another aspect, the robotic handler 402 may use tactile feedback from the tactile sensor 406 to control, e.g., grip strength for a robotic hand, gripper, or other end effector or the like, or to control an amount of instantaneous contact force, torque, or the like applied to a workpiece being manipulated by the robotic handler 402. In another aspect, the tactile sensor 406, or an array of tactile sensors 406, may be used to create a visualization of a contact force field, pressure field, or surface topology which can be presented in a display 410 to a human operator in order to assist the operator in controlling actions by the robotic handler 402 with respect to a workpiece.

The system 400 may include a computing device 412 that may be used, e.g., to process data from the tactile sensor 406, to control operation of the robotic handler 402, to provide a user interface for the robotic handler 402, and so forth. For example, the computing device 412 may be configured, e.g., by code stored in a memory and executing on a processor of the computing device 412, to identify objects or surfaces contacted by the tactile sensor 406 of the robotic handler 402, to generate alerts to a user based on tactile feedback acquired from the tactile sensor 406, to decide upon an action for a workpiece contacting the tactile sensor 406 (including decisions recommended to a user, and decisions automatically executed by the robotic handler 402), and so forth. In one aspect, the code may usefully employ, e.g., machine learning models or the like for identification, decision-making, and other intelligent sensing and/or data-driven operations.

Figure 5:
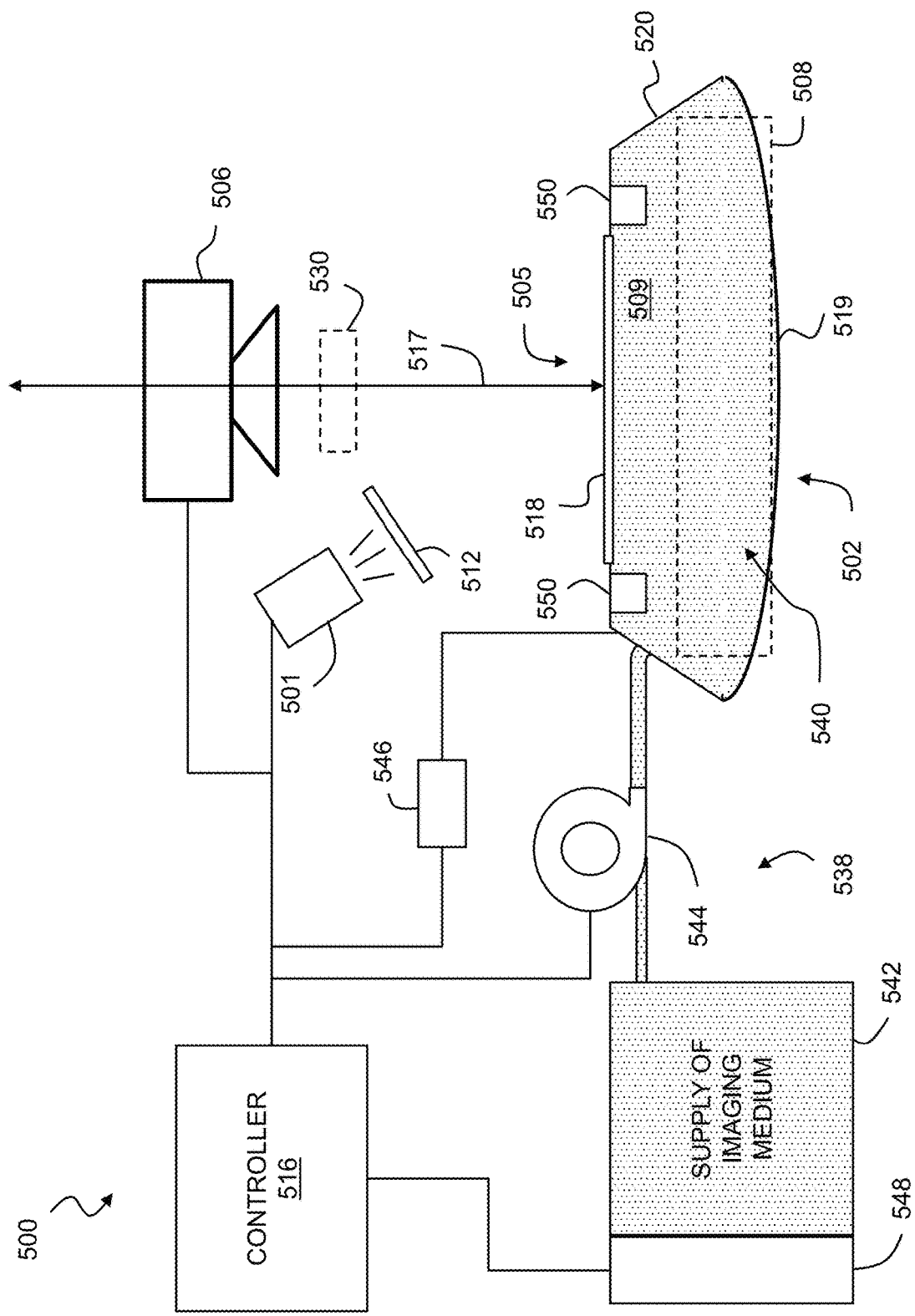
FIG. 5 shows an imaging system with a tactile sensor.

FIG. 5 shows an imaging system with a tactile sensor. In general, the imaging system 500 may include a tactile sensor 502 such as any of the fluid tactile sensors or the like described herein. The imaging system 500 may also include a light source 503, an imaging device 506, a controller 516, and an imaging volume 508 at least partially spatially intersecting with a fluid layer 509 of the tactile sensor 502 when the tactile sensor 502 is placed for use relative to the imaging device 506. An optical element 513 may be positioned to control illumination of the imaging volume 508 by the light source 503.

The tactile sensor 502 may include any of the fluid tactile sensors described herein for contacting a target surface to facilitate three-dimensional imaging. The tactile sensor 502 may, for example, include a fluid imaging medium contained within a membrane 519, a substrate 518 (such as an optically clear, rigid sheet of material), and one or more containing walls 520. The imaging system 500 may have an axis 517, such as an imaging axis or an optical axis, that passes through the imaging volume 508. When the tactile sensor 502 is placed for use in the imaging system 500, the sensing region (where the fluid layer 509 and the imaging volume 508 intersect) of the imaging system 500 may thus intersect the axis 517 of the imaging system 500 so that the imaging device 506 can capture images of the sensing region. In one aspect, the tactile sensor 502 may be removably and replaceably coupled to the imaging system 500, and may be mechanically keyed or otherwise coupled to the imaging system 500 in a manner that aligns a portion of the fluid layer 509 of the tactile sensor 502 with the imaging volume 508 of the imaging system 500 to form the sensing region.

The light source 503 may be any illumination source suitable for providing illumination through the optical element 512 and into the imaging volume 508. When the tactile sensor 502 is placed for use in the imaging system 500, the light source 504 may illuminate the sensing region, e.g., the imaging volume 508, and permit capture of images by the imaging device 506. These images may, in turn, be processed by the controller 516 to resolve three dimensional surface information for an object contacting the membrane 519 within the sensing region, along with any of the other information described herein. In one aspect, the light source 503 may be a laser or other device that has a coherent, fixed focus and/or that provides collimated illumination. In this context, it will be understood that the fixed focus may include light focused at infinity, i.e., light that is collimated or formed of parallel ray traces, as well as light with any other fixed focus that can be used to create the illumination patterns described herein. In another aspect, the light source 503 may provide unfocused illumination, with suitable modifications to the optical element 512 and other optical features.

The imaging device 506 may be a camera or any other combination of optical devices, lenses, filters, optical fibers, and other hardware suitable for capturing images of the imaging volume 508 for use by the controller 516 in resolving three-dimensional images. In general, the imaging device 506 may have an imaging axis, such as the axis 517 of the imaging system 500, passing through the imaging volume 508 in order to capture images thereof. The controller 516 may include any processor, microcontroller, or other circuitry, or combination of the foregoing, suitable for controlling operation of the imaging system 500 to acquire three-dimensional information as described herein. In one aspect, the controller 516 may be physically coupled to the imaging system 500 and may be configured to acquire data for transmission to a separate processor for processing. In another aspect, the controller 1208 may include one or more microprocessors, field programmable gate arrays, graphics processing units, and/or other processors configured to process images and resolve image data into three-dimensional data for a surface within the imaging volume 508. In one aspect, the controller 516 may include a processor configured by instructions stored in a memory to receive one or more images from the imaging device 506 including a pattern created by the optical element 512 and reflected by the membrane 519 (or a coating on the membrane, such as a thin, reflective coating) as it deforms to a target surface of an object within the imaging volume 508. This processor, or another processor integrated into the imaging system 500, or communicatively coupled to the imaging system 500, may be further configured by instructions stored in a memory to calculate a quantitative surface topography of the membrane 519 based on the image(s) captured by the imaging device 506. As described herein, the surface may include, e.g., a deformable surface of the membrane 519 intersecting the imaging volume 508 and conforming to a target surface of an object to be measured. It will be understood that the surface measured may include an exterior surface of the membrane that contacts the target surface, an interior surface of the membrane contacting the fluid layer 509, or some combination of these or some other layer, such as an interior layer therebetween.

The imaging volume 508 may generally define a three-dimensional field of view for the imaging device 506. As described above, the imaging device 506 may have an imaging axis, such as the axis 517 of the imaging system 500, that passes through the imaging volume 508. A plane may intersect the imaging volume 508 and lie perpendicular to the axis 517 of the imaging system 500 (and the imaging device 506). This plane may also lie perpendicular to the plane of FIG. 5, and would appear as a horizontal line passing through the imaging volume in the figure.

The optical element 512 may include any optical element or combination of optical elements including diffraction gratings, lenses, filters, microtextured surfaces, metasurfaces, or any other optical devices suitable for controlling illumination and/or creating a desired illumination pattern within the imaging volume 508. In one aspect, the optical element 512 may create a pattern including a plurality of features such as dots, lines, polygons, or the like that can be identified within an image of the imaging volume 508 captured by the imaging device 506. For example, the pattern may usefully include a first plurality of features closely spaced within the plane and a second plurality of features visually distinguishable from the first plurality of features and more distantly spaced within the plane. In this pattern, the more distantly spaced features may provide fiducials or landmarks within the imaging volume 508 to assist in processing, while the more closely spaced features support higher-resolution sensitivity to surface topography. The pattern may also or instead include a first plurality of features and a second plurality of features collectively forming a regular geometric pattern within the plane, with the second plurality of features forming visually distinguishable anchor points within the pattern. The anchor points or landmarks may be spaced sufficiently far apart so that they are unlikely to intersect (or physically unable to intersect) within the imaging plane as a result of deflection along the axis 517. In these embodiments, the pattern may generally include a first plurality of features closely spaced to provide high resolution detection of depth within the imaging volume and a second plurality of features placed sufficiently far apart within the plane through the imaging volume 508 to avoid intersections along the imaging axis (e.g., axis 517) within the imaging volume 508 during a maximum expected deformation of the membrane 519 as it contacts a target surface. It will be understood that in this context, the expected deformation may include z-axis displacement, as well as any x-axis or y-axis displacement resulting from sheering, wrinkling, and the like of the optical element as the imaging system 500 is placed against a target surface and manipulated by a user.

It will be understood that the membrane 519 may also or instead include visible patterning or texturing of similar arrangements and for similar purposes. However, optically creating these patterns can provide additional flexibility, for example, by facilitating changes to the pattern during imaging, or by more generally permitting changes to a visible pattern independently from the optical properties and physical construction of the membrane 519.

In one aspect, the optical element 512 may include a diffractive optical element positioned to receive the illumination from the light source 503 (e.g., a coherent light source such as a laser) on a first surface (e.g., a surface facing the light source 503) and create a three-dimensional illumination pattern within the imaging volume 508 from a second surface opposing the first surface (e.g., a surface facing the imaging volume 508). Where a diffractive optical element is used, the diffractive optical element may include micropatterned structures, e.g., on either or both of these surfaces, optionally along with additional lenses, that cooperate to create the desired illumination pattern when a suitable light source is directed toward the optical element 512. A variety of types of diffractive optical elements are known in the art, and may be used to create illumination patterns that vary in intensity in a far-field plane, and that vary in intensity and/or focus along an imaging axis. As a significant advantage, these properties may be exploited to create a three-dimensional illumination pattern within the imaging volume 508 of an imaging system 500 to facilitate resolution of three-dimensional information from a target surface contacting the membrane 519 of the tactile sensor 502. Any number of additional optical components may also or instead be included to create illumination patterns as described herein. For example, interfaces between layers or components of the optical system may incorporate light shaping features such as lenses, filters, and the like, e.g., to control optical power, compensate for distortions or wavefront errors, control exit angles, and so forth.

In one aspect, the optical element 512 may include a diffractive optical element or other optical device that generates a three-dimensional illumination pattern or structure varying with depth or distance from the optical element 512. For example, a three-dimensional illumination pattern may include diverging illumination projections such as a grid, point array, cone, or pyramid pattern that diverges (e.g., becomes larger in an imaging plane) as distance from the optical element 512 increases, or more generally, a three-dimensional pattern varying along the imaging axis (e.g., the axis 517) within the imaging volume 508. In another aspect, the three-dimensional illumination pattern may include a pattern with one or more features that vary along a line of projection from the optical element 512. For example, a circle, dot, or other image may change in intensity or focus (with or without a change in size) as a distance of the projected image from the optical element 512 increase, or may appear or disappear at different focal lengths.

In many illumination patterns, steeper incident angles (e.g., more acute angles relative to the plane) can provide greater sensitivity to three-dimensional displacement. As such, it may be advantageous to include one or more additional light sources 503 and/or optical elements 512 to provide illumination from different directions around the axis 517 of the imaging device 500 so that different regions of the imaging volume 508 can benefit from steep side illumination. In one aspect, these additional light sources 503 may also use different spectral bands so that different patterns can be captured simultaneously, e.g., in a single image frame, where visual features can be associated with specific light sources 503 and illumination patterns based on wavelength. This approach can also advantageously improve sensing of occluded areas and/or steep or sharp surface features of a surface. Thus, in one aspect, three-dimensional data for different portions of the imaging volume 508 may be calculated using illumination from different light sources 503 and/or optical elements 512. While the images captured by the imaging device 506 in such embodiments may be divided and processed strictly in this manner (e.g., with one side of the imaging volume 508 processed using illumination from an opposing side of the imaging volume 508), the image data from different illumination directions may also or instead be combined or weighted in a number of manners where such combinations can be demonstrated to improve accuracy or repeatability for particular regions of the imaging volume 508 or particular imaging applications, or where such combinations permit analysis of occluded regions, deep valleys, and the like.

In another aspect, different illumination sources may be multiplexed, e.g., by using light of different wavelength ranges (or different specific wavelengths) to illuminate the imaging volume 508 from different directions, and by separately processing the images from these different wavelength ranges so that multiple images from multiple illumination directions can be concurrently captured and/or processed. According to the foregoing, the imaging system 500 may usefully include a second optical element 512 positioned and structured to create a second pattern within the imaging volume 508 for a different location about a perimeter of the imaging volume 508 than the first optical element 512. More generally, two or more additional light sources 503 and/or optical elements 512 may be incorporated into the imaging system 500 to improve imaging under various imaging conditions with various surface topographies.

In another aspect, additional imaging techniques may be incorporated into the imaging system 500, e.g., to improve accuracy and robustness of the imaging system 500, to support higher-speed, lower-resolution processing for certain imaging contexts (image previews, sparse three-dimensional processing, etc.), or for other reasons. Thus, in one aspect, the imaging system 500 may include a multi-view imaging system (e.g., a stereoscopic imaging system, photometric stereo system, or the like) configured to calculate a quantitative surface topography of a surface within the imaging volume 508 based on images of the surface from two or more different perspectives. In this context, a multi-view imaging system may include a stereoscopic imaging system, a photometric stereo system, or the like, and/or imaging systems that are multiplexed using fluorescence, different visible and/or infrared wavelengths, and so forth. In another aspect, a gradient-based system may use unfocused illumination from various directions to resolve three-dimensional surface information. In general, these alternative imaging modalities may be optically multiplexed (e.g., channelized into different wavelengths or wavelength ranges) for concurrent operation with the system described above. For example, these alternative systems may resolve a three-dimensional shape of a target surface using light from a second light source in a second spectral band having wavelengths non-overlapping with a first spectral band of the light source 503 and/or one or more other light sources used by the imaging system 500.

More generally, any of a variety of complementary imaging modes may be used to measure absolute depth with greater accuracy, and/or to adapt to various topologies and imaging applications. For example, the imaging system 500 may use multi-view three dimensional imaging based on stereo parallax, or a system with an optical pattern that translates depth directly into X-Y displacement, or any other triangulation-based or other depth measurement technology. As a significant advantage, these complementary techniques for measuring absolute depth, can support improved measurement of low spatial frequency three-dimensional features such as macroscopic, large-scale features of a target surface that are preferable removed before measuring micron scale surface features with gradient-based depth calculations or the like. Furthermore, these alternative depth measurements can provide information on the amount of compression of the fluid layer 509 in order to provide real-time guidance and user feedback for optimal compression, support higher-speed rendering (e.g., using a sparser data array), support measurements of high frequency force (e.g., using a finite element model of the fluid layer 509), and so forth.

The membrane 519 may be a deformable membrane that can deform when placed in contact with a target surface for measurement. The membrane 519 may be opaque, reflective, or some combination of these. For example, the membrane 519 may include a thin, reflective coating on an exterior surface opposing the imaging device 506, or an interior surface facing the imaging device 506. The membrane 519 may also or instead be fabricated from a material that is suitably reflective. The membrane 519 may be formed of any elastic polymer or other sheet of material that is suitably pliable to conform to surfaces of interest and, where useful, suitably elastic to expand or contract according to a volume of media in the fluid layer 509 and/or surface pressure on the membrane 519. In one aspect, the exterior surface of the membrane 519 may be coated with a functional coating, e.g., to reduce friction or mitigate trapped air bubbles or the like. The membrane 519 may also include any suitable optical coatings useful for the imaging modality used to acquire surface data. For example, this may include opaque surfaces, colored surfaces, partially transparent surfaces (e.g., that transmit at some wavelengths and reflect at other wavelengths), patterned surfaces (either applied to a material of the membrane 519, or inherent to the material of the membrane 519), and so forth.

In one aspect, the imaging system 500 may include a supplemental depth measurement mode used to measure a distance to a target surface, estimate a compression of a fluid layer 509, and provide feedback to a user guiding the user to an optimal range of contact forces. This may, for example, include user feedback via a number of LED's or the like on a handheld imaging device indicating whether and how a user should reposition the device to acquire an image or improve image quality. This may also or instead include other user feedback guiding a user in proper positioning of the device, such as an auditory output from an audio output device, or a display in a user interface for the imaging system 500, e.g., on a computer or the like coupled to a handheld device.

In one aspect, the imaging system 500 may include a lens 530 for variably focusing the imaging device 506 on a surface within the imaging volume 508, such as a reflective surface of the membrane 519 or a plane within the imaging volume 508. For example, the lens 530 may include a liquid lens that uses a combination of optical fluids and a polymer membrane to change focus by changing shape, or any other adaptive lens or the like. A liquid lens advantageously provides a compact mechanism for controlling focus without mechanical, moving parts and without mechanically moving a lens along the imaging axis to change focusing distance. However, other lenses may also or instead be used to focus of the imaging device 506 at various depths or z-axis positions through the imaging volume 508 and along the imaging axis, and may be adapted for use in an imaging system 500 as described herein, such as a lens system focused with a piezo-focus drive, a voice coil motor, or any other electromechanically controlled lens or lens system suitable for z-stack image acquisition.

The lens 530 may advantageously include one or more high-resolution lenses with narrow depth-of-field. In order to avoid low-pass filtering that might otherwise be imposed by a locally out-of-focus lens, the lens 530 may be variably focused to scan through a range of depths (e.g., along the z-axis or imaging axis) to provide partial, locally-focused images at each desired depth. This stack of images can be assembled into a single image with greater depth-of-field for subsequent three-dimensional processing, e.g., with photometric stereo, or to directly measure quantitative depth information by finding the best focus among various focal depths for local regions within the imaged field. This single image with improved depth-of-field also permits recovery of texture or the like, and may be combined with other imaging modalities (such as photometric stereo) to provide more accurate and high resolution surface measurements across an imaged field without distortion artifacts.

In one aspect, the system may use photometric stereo imaging to measure surface orientation, e.g., as surface normal vectors based on pixel intensity, which can be integrated to resolve three-dimensional surface data. This reconstruction approach can be sensitive to small changes in surface orientation that cause low frequency distortion, resulting in small scale distortions across the measured field. Thus, the system may supplement photometric stereo imaging with triangulation-based 3D reconstruction, which advantageously permits direct depth measurements at each location to provide distortion free 3D measurements at lower resolution. This combined approach advantageously supports high resolution 3D measurements with consistent resolution and accuracy across the entire imaging field.

For example, a pattern projection system for the device may create a dot pattern projected at a highly oblique angle to the target surface (and/or membrane 519). Suitable patterns may be created using laser illumination of a Diffractive Optical Element (DOE), which may be micro-patterned to suppress and amplify specific diffractive orders (using the coherence of the laser) to create an optical pattern with the desired locations for dots or other objects, shapes, symbols, etc. The DOE may also be configured (e.g., by micro-patterning the surface(s) thereof) to adjust for a varying focus across the imaging volume due to the highly oblique projection angle relative to an imaging plane within the imaging volume. In general, the projected pattern may be imaged by the imaging device 506 to provide triangulation for 3D imaging. As an object for measurement is pressed into a contact surface of the membrane 519, the dot pattern will be warped in the imaging volume 508 according to the local depth change. The motion of the dots thus encodes the 3D shape of the object in a manner that can be captured and resolved into 3D data with the imaging device 506 and an associated processor (which may be the controller 516 or some other processing device).

More generally, an imaging system as described herein may use any suitable combination of different three-dimensional imaging modalities within or in addition to a retrographic sensor or other imaging device having a fluid imaging medium. For example, in one aspect, there is disclosed herein a device including an imaging volume within a fluid imaging medium defining a three-dimensional field of view for capturing images; along with an imaging system configured to calculate a quantitative surface topography of a target surface intersecting the imaging volume within the three-dimensional field using two or more three-dimensional imaging modalities. For example, the one or more imaging modalities may include photometric stereo and multi-view stereo imaging. The photometric stereo may, for example, use a single camera, with directional lighting provided from two or more directions. Depth is encoded in shading variation between the captured images (e.g., intensity gradient). This modality supports spectral multiplexing, e.g., with red-green-blue (RGB) or hyperspectral imaging to capture an image with multiple illumination directions in a single image frame. The one or more imaging modalities may also or instead include a multi-view stereo imaging modality that employs any of a variety of techniques to obtain depth information from multiple cameras or views.

The one or more imaging modalities may also or instead employ single camera triangulation. In this modality, the imaging volume is illuminated with structured light from one or more directions (different than the viewing direction for the camera), and depth is determined based on an imaged pattern relative to a reference image of the structured light captured during calibration. Or alternatively, a pose of a single camera may be moved to different locations in order to capture different images of a target surface. Where multiple light directions are used for illumination, these different directions of illumination are preferentially separated temporally or spectrally in order to avoid visual interference among overlapping illumination patterns.

In another aspect, multi-view stereo or triangulation may be used to obtain depth information from two or more cameras under structured illumination. In another aspect, multi-view stereo or triangulation may be used to obtain depth information from two or more cameras based on surface texture.

In another aspect, one of the imaging modalities may include depth-from-focus or focus stacking where focus/defocus along an optical axis through the imaging volume is used to infer depth. This may be used instead of or in addition to the multi-view stereo techniques described above. A focus stacking system may use uniform natural light, provided the target surface contains sufficient natural texture to evaluate focus. In another aspect, structured light (typically coaxial with optical axis) may be used, particularly where the target surface does not provide suitable features for evaluating focus. In either case, different colors can be focused at different depths in order to support increased depth resolution using spectral multiplexing. In another aspect, one of the imaging modalities may include time-of-flight imaging, where distances are directly captured in known directions, and used to reconstruct measured surfaces.

In one aspect, the window 505 may be a rigid substrate of optically clear material, and the membrane 519 may be a balloon filled with fluid and coupled to the window 505 to form an inflatable reservoir. In this embodiment, a camera or the like may be mechanically coupled in a fixed relationship to the window, and the camera may be manually or automatically moved about, permitting the balloon to deform while the pose of the camera shifts over a target surface contacting the membrane 519 to facilitate three-dimensional reconstruction based on shape-from-motion.

In one example embodiment, the imaging system may use photometric stereo and multi-view stereo with a visibly textured surface or the like on the contact surface of the membrane 519 (or an interior surface of the membrane 519 facing the imaging device 506). The texture may generally be a physical texture providing optically visible features, an optical texture created with suitable optical treatments, or some combination of these. For example, the texture may include be a random texture that is invisible unless specific illumination is used. Such a texture may be created using fluorescent pigments, which are visible only when illuminated by UV light. In another aspect, the membrane 519 may use IR absorbing pigments to create a random texture that can be illuminated with infrared light to make the texture visible. In this combination the random texture may be imaged only by the cameras dedicated to multi-view stereo, while a photometric stereo camera (single camera) captures images of a field of view in the imaging volume 508 without the texture based on illumination in a different spectral band that is provided from different illumination directions. It will be understood that other arrangements of photometric stereo and the various multi-view imaging techniques described above may also or instead be used.

Other range-finding or three-dimensional imaging techniques may also or instead be used, including without limitation confocal imaging, interferometric imaging, Light Detection And Ranging (LiDAR), and so forth.

In one aspect, the imaging system 500 may include a fluid management system 538 to manage the amount and/or pressure of the fluid imaging medium 508 within a reservoir 540 formed by the membrane 519, the substrate 518, and one or more containing walls 520 that collectively retain the fluid imaging medium 508 of the fluid layer 509. It will be understood that, while the reservoir 540 may include one or more containing walls 520 as illustrated in FIG. 5, the reservoir 540 may instead be formed exclusively of a flexible membrane, or by the membrane 519 and the substrate 518, or more generally, any combination of flexible, elastic, and/or rigid membranes, walls, and other structures suitable for containing a fluid medium for use in imaging as described herein. The fluid management system 538 may generally include a supply 542 of the fluid imaging medium 508 coupled in fluid communication with the reservoir 540, a pump 544 or the like to control a volume and/or pressure of the fluid imaging medium in the reservoir 540, and a sensor 546 for detecting, e.g., pressure within the reservoir 540. The fluid management system 538 may also include a controller 516 (which may be the same controller 516 that operates the imaging system 500, or a separate controller for operating the fluid management system 538, or some combination of these) for controlling the pump 544 and/or other hardware associated with the tactile sensor 502. In general, the tactile sensor 502, also referred to herein as a fluid tactile sensor, e.g., when containing a fluid imaging medium 508, may be used in addition to or in place of an elastomeric sensor or other sensor or sensor cartridge described in the documents incorporated by reference herein, except as specifically noted otherwise. It will also be understood that a system using the tactile sensor 502 may include any of the other components described herein including, e.g., cameras or other imaging hardware, lenses and other optical components, light sources, robotic actuators and controllers, and so forth, in order to capture and analyze images when the tactile sensor 502 is placed in contact with a target surface.

The containing wall(s) 520 may be formed of material suitably rigid to mechanically support the reservoir 540 and the imaging medium 508 contained therein, as well as to support mechanical coupling to an imaging device such as any of the devices or systems described herein. This may include mechanical keying formed into the containing wall(s) 520, or coupled to the containing wall(s) 520, to enforce a predetermined position and/or orientation within a handheld imaging system.

One or more windows 505 may be formed by, or within, the substrate 518 supporting the membrane 519 and containing wall(s) 520, e.g., as necessary or useful to support imaging functions such as illumination and optical imaging. The window(s) 505 may be formed of an optically clear material and/or a material index matched to the imaging medium 508 in order to facilitate optical functions of the tactile sensor 502 such as illumination and imaging. The optical and other properties of the window(s) 505 may depend, for example, on the imaging modality used to capture topographical information, and may vary according to the wavelength(s) used, the technique(s) used (e.g., multi-view structured light, time-of-flight, ultrasound, etc.), and so forth. In one aspect, an interior surface of the substrate 518 (e.g., the surface facing the reservoir 540) may be index-matched to the imaging medium 508 in order to mitigate optical artifacts due to the interface. In another aspect, the surfaces of the containing wall(s) 520 may integrate light shaping features such as filters, lenses, and so forth to support improved imaging, which may be deployed within the walls and/or as an additional film or surface treatment on or in between other elements. In one aspect, the window 505 may usefully be formed of a rigid, optically clear material to facilitate a consistent imaging environment for the imaging device 506, as well as consistent transfer of force from a housing to the windowed surface of the reservoir 540. However, in one aspect, the window 505 may also or instead be formed of a pliable and/or elastic membrane that is (a) suitable for retaining the imaging medium 508 within the reservoir 540 and/or (b) optically transparent to facilitate illumination and image acquisition through the window 505.

The window(s) 505 (and any other optically functional surfaces of the device) may generally be augmented for imaging with various additional structures, configurations, and/or additional components. For example, a component of the tactile sensor 502 may support light shaping, light piping, or the like, and/or may be configured with micro-texturing or surface treatments to control optical performance. In one aspect, a rigid structural support may be added to facilitate manipulation of the tactile sensor 502, particularly where the tactile sensor 502 is formed of a membrane 519 without containing wall(s) 520. In this latter aspect, a light guiding film may be deployed between the membrane 519 and the rigid holder to control illumination therethrough. Additionally, a rigid holder for the membrane 519 may have optically powered surface(s) such as a free-form lens surface that can distribute light evenly on a deformable sensing surface of the membrane 519 to form a deformable sensing surface.

In another aspect, the substrate 518, or a window 505 therein, may include multiple optical layers at an interface with the fluid layer 509. These additional layers may be used to control light transmission at the interface. For example, the surfaces of the layers may be engineered to maintain internal reflection within the interface except for light that is incident at specific angles. This permits control over the distribution and directionality of light exiting the window 505, either toward the camera 506, toward the fluid layer 509, or both, which may be used to diffuse or distribute illumination, or to control exit angles, e.g., to improve grazing illumination of the membrane 519 for purposes of three-dimensional surface reconstruction. The interface may usefully be controlled in this manner using a variety of techniques, such as varying indices of refraction, incorporating lenticular lenses or other surface structures, adding filters or diffusers, and so forth.

The membrane 519 may, in general, include any of the surface coatings or treatments described for use with tactile sensors herein. For example, the membrane 519 may include interior and/or exterior coatings to impart desired optical properties. This may, for example, include opaque coatings, reflective coatings, colored coatings, optically patterned coatings, filters, anti-glare treatments, index-matched coatings, and so forth. The membrane 519 may be formed of a variety of materials including flexible and/or elastic sheet materials such as elastomers, or any other film, foil, or the like suitable for retaining the imaging medium 508 within the reservoir 540 and conforming to a target surface with sufficient fidelity to support desired z-axis resolution of the target surface through the tactile sensor 502, e.g., as generally described herein.

The membrane 519 may be adapted for various types of imaging. For example, in one aspect, it may be desirable to view a target surface, in which case an optically clear or otherwise optically transmissive material suitable for imaging may be used. In another aspect, visual information from the target surface may interfere with three-dimensional reconstruction of the target surface. In this case, an optically opaque material may be preferred. In another aspect, the membrane may be opaque at some wavelengths and clear at other wavelengths, permitting the use of a wavelength-multiplexed imaging system to capture visual information from the target surface at one wavelength range while permitting three-dimensional reconstruction of an opaque surface (e.g., using shape-from-shading or the like) at another wavelength range.

The membrane 519 may use a variety of surface treatments for different imaging modes or techniques. For example, the membrane 519 may have a physically or optically textured surface to permit recovery of shape from motion or stereoscopic imaging or the like. In one aspect, the texture may be spectrum-dependent, that is, the texture may be viewable only in the visible light spectrum, only in the infrared spectrum, only in the short wave infrared spectrum, or some combination of these. In this manner, the membrane 519 may have different optical properties at different wavelengths. For example, the membrane 519 may be transparent in one or more ranges of wavelengths, opaque in one or more other ranges of wavelengths, and/or textured in one or more other ranges of wavelengths to facilitate a range of multiplexed imaging techniques. The membrane 519 may also or instead include a physical texture, such as an outside texture to control friction or permit egress of trapped air at a contact interface, or on the inside to support texture-based imaging. More generally, the membrane 519 may incorporate a variety of functional coatings useful in different imaging contexts.

In one aspect, the membrane 519 may include a reflective surface or coating to permit imaging of light reflected back into the reservoir from a region of the membrane 519 contacting a target surface. It should be noted that reflectance, the ratio of incident light to reflected light, may vary by wavelength. Thus, the membrane 519 may be fully or nearly fully reflective at one or more wavelengths or ranges of wavelengths, while completely absorbing and/or transmitting light at others. Thus, reflectance herein should be understood as occurring at a wavelength or within a range of wavelengths matching other imaging components of the system. In general, within such wavelengths, this may be any degree of reflectance sufficient to facilitate image capture in support of three-dimensional reconstruction as described herein.

The membrane 519 may be structurally and/or functionally adapted to augment imaging in a variety of ways. In one aspect, the membrane 519 may include a temperature-sensitive material or coating in order to permit direct optical observation of temperature or temperature changes across a contact surface. For example, the temperature-sensitive material may have one or more optical properties (e.g., color, opacity, transmissivity, etc.) that vary with a temperature of the membrane 519. In another aspect, the membrane 519 may have interior and/or exterior treatments to facilitate measurement of wall thickness for the membrane 519, which permits inferences about deformation, fluid pressure, and so forth. For example, the membrane 519 may have one or more properties that vary according to wall thickness, including optical properties (color, opacity, etc.), electrical properties (e.g., conductivity), and so forth. Other sensing modalities may also or instead be integrated into the membrane 519. For example, the membrane 519 may be configured to sense temperature, moisture, radiant heat, electrical conduction/resistance, static charge, and so forth. This may, for example, include an optical property that varies according to the sensed parameter of interest. This may also or instead include sensors or sensing materials that permit direct electrical measurement of the sensed parameter of interest, e.g., with a mesh of sensing nodes or the like embedded within the membrane. For example, regarding contact force, the membrane 519 may infer a contact force based on pressure within the reservoir and a contact area, or the membrane 519 may use electrically conducting material that changes resistive or conductive properties when exposed to pressure or strain. In another aspect, other techniques may be used to directly measure contact force at locations along the membrane 519.

In another aspect, the membrane 519 (and/or the containing wall(s) 520) may be used as a light guide to facilitate imaging. For example, the membrane 519 may include a light guide to channel light through the membrane 519 in a manner that enters at a light source and exits at any desired regions for directed illumination of the imaging medium. The inner surface of the membrane 519 may also or instead incorporate light extracting features or other light management features in order to filter light, introduce light, guide light, shape light, and/or expose light from illuminated surfaces for capture and processing. Additionally, the membrane 519 may have multiple layers with refractive indices that facilitate light guiding in one layer, and illumination in a different layer.

More generally, a fluid tactile sensor provides great flexibility in terms of shape (of the balloon or membrane containing the fluid), pliability (by controlling pressure in the reservoir 540 and/or the viscosity of the fluid medium), volume (by inflating or deflating a reservoir bounded by an elastic membrane), and so forth. Similarly, functional properties of the contact surface may be controlled by the selection of materials used to fabricate and/or coat the membrane 519. Suitable materials for a flexible membrane include latex, silicon rubber, or any other material or combination of materials that can be fabricated as a thin coating on a substrate (which may have a shape selected according to an intended use of the sensor). Optical properties and mechanical properties such as elasticity may also usefully be controlled by controlling thickness of the membrane 519. For example, a layer with a thickness of 1-10 microns can be readily manufactured with many common elastomers that will be suitably elastic and conformable for high resolution imaging.

The imaging medium 508 may be any fluid such as a liquid or a gas with suitable optical properties for imaging as contemplated herein. For example, this may include an optically transparent material that allows transmission of light waves at one or more wavelengths used by an imaging system associated with the tactile sensor 502. In one aspect, this may include a clear gas such as air or an inert gas, or a clear liquid such as water or oil. However, it will be understood that where alternative imaging techniques are contemplated, an imaging medium with corresponding transmissive properties may instead be suitable. For example, for ultrasound imaging, an acoustically transmissive material may be used, even if the material is optically opaque. It will also be understood that a fluid may include any suitable combination of liquids, gases, and other phases, and/or materials in various states of transition between a gas and a liquid. For example, steam may include evaporated water in a gaseous state within air (e.g., primarily oxygen and nitrogen), which may serve as a fluid as described herein. Steam may also condense to form a mist or aerosol that also behaves as a fluid suitable for use with the imaging techniques described herein. In one aspect, water condensation may be used to provide texture to an imaging surface, regulate temperature-controlled pressure within a tactile sensor, or otherwise enhance function of a tactile sensor as described herein. More generally, a gas may contain moisture as a vapor that does not significantly affect optical clarity of the gas, and a fluid may contain dissolved gas, similarly without significant affect on optical clarity. All such combinations are intended to fall within the scope of a fluid imaging medium as described herein.

The use of fluids as the imaging medium in the fluid layer 509 can provide numerous advantages over elastomer and/or gels. For example, the use of a fluid with suitable properties, such as mechanical properties, physical characteristics, or the like, may allow the imaging medium 508 to conform more closely to a target surface, particularly when used in combination with a sufficiently yielding membrane 519. This can facilitate the acquisition of surface data for high-aspect ratio features such as shelves and deep troughs or valleys. A fluid-based sensor may also enter deeper into structures, and permit access to negative corners or other occluded regions. In one aspect, the entire imaging device may be deflated, inserted into a chamber through a passage, and then inflated for use in imaging as otherwise described herein. This permits use of the corresponding contact-based imaging techniques in body cavities, containers, or other interior spaces that can only be accessed through smaller openings. In one aspect, an exterior of the membrane 519 may be coated with graphite or other low-friction surface treatments to facilitate access to such spaces, and/or to improve conformance of the membrane 519 to target surfaces.

As another advantage, fluid can be added to or removed from the reservoir 540, thus controlling the mechanical properties of the contact surface formed between the membrane and a target surface. For example, the pressure in the fluid layer 509 may be increased to support inverted use or decreased to enhance conformance to a target surface. In another aspect, when imaging non-rigid targets such as soft or flexible materials, the pressure of the reservoir 540 may be changed between measurements, thus providing information about the mechanical properties of the target surface. As a further advantage, a force exerted on the membrane 519 by a target surface may be measured, e.g., by measuring a pressure within the reservoir 540. This information may be used, e.g., to control movement of a robotic system associated with the tactile sensor 540, to draw inferences about the modulus of a target surface, or for any other purpose. In another aspect, pressure waves may be propagated through the fluid layer 509, and used to measure dynamic mechanical properties of a target surface, e.g., based on the manner in which the target surface deforms in response to propagating pressure waves.

The supply 542 may be a tank, canister, syringe, or other vessel that holds additional imaging medium 508 for addition to the reservoir 540. The supply 542 may also optionally recover imaging medium 508 from the reservoir 540 when the tactile sensor 502 is being deflated or depressurized. While a single supply 542 is illustrated, it will be understood that they system 500 may include two or more supplies 542. This may be useful, for example, where different fluids or fluid types are exchanged within the fluid layer 509, e.g., to change the index of refraction of the fluid layer 509 relative to the window 505 in order to control illumination of the membrane 519 (e.g., by changing the differential between the indices of refraction at an interface between the fluid layer 509 and the window 505.

The pump 544 may be any pump or other device for transferring the imaging medium 508 to and from the reservoir 540. This may include syringe plungers, rotary pumps, pistons, hydraulic pumps, peristaltic pumps, and so forth. Where the imaging medium 508 is a gas, flow control may be managed in other ways, such as by providing a canister of pressurized gas as the supply 542, and using one or more valves to vent pressurized gas from the supply 542 into the reservoir 540 (to pressurize) and to vent gas from the reservoir 540 to the environment (to depressurize). In one aspect, the pump 544 may include two separate pumps and/or fluid paths including a first fluid path for transferring the imaging medium 508 to the reservoir and a second fluid path for transferring the imaging medium 508 to the supply 542. In general, the pump 544 may control fluid transfer based on a sensed pressure, e.g., to maintain a target pressure, or to controllably increase or decrease pressure over time. In another aspect, the pump 544 may control fluid transfer based on fluid volume. This may include managing fluid transfer to obtain a predetermined volume within the reservoir 540, which may be estimated based on operation of the pump 544, or measured using a volume flow rate sensor or the like within a fluid path for the imaging medium 508. In another aspect, a volume within the reservoir 540 may remain substantially constant, and the pressure within the reservoir 540 may be measured over time and used as an input to imaging processes or other analysis of data acquired with the imaging system 500.

The one or more sensors 546 may include any sensor or combination of sensors suitable for monitoring the imaging medium 508 within the reservoir 540. For example, this may include liquid or gas pressure sensors positioned to measure fluid pressure within the reservoir 540 (or along the supply line to the reservoir 540). In another aspect, pressure may be inferred by monitoring the pump 544, e.g., to determine the amount of work associated with fluid transfer into (or out of) the reservoir 540. In another aspect, the one or more sensors 546 may include temperature sensors for measuring fluid temperature, surface temperature of the reservoir, or any other temperature. This may be used, e.g., to estimate heat transfer through the imaging medium, temperature of the contact surface, and so forth. In another aspect, the temperature of the imaging medium may be controlled, e.g., to control viscosity of the imaging medium, to apply heating or cooling to the target surface, or for any other useful thermal function.

A controller 516 may be used to acquired data from and/or control operation of other active components of the system, such as the pump 544 and the one or more sensors 546. The controller 516 may include, e.g., a microcontroller, microprocessor, or other processor or the like, and may be configured by computer executable code to perform the various functions described herein.

In another aspect, the one or more sensors 546 may include temperature sensors that may be used, e.g., to monitor a temperature of the imaging medium 508 within the reservoir 540 and/or within the supply 542. This may be useful for a variety of purposes such as controlling fluid temperature, e.g., when used in contact with a temperature-sensitive surface, or for estimating heat transfer to or from a target surface that is contacting the membrane 519. Where temperature control is desired, the system may also include a temperature controller 548 such as a heater, cooler, or combination of these that can be controlled, e.g., by the controller 516, to increase and/or decrease a temperature of the imaging medium 508. A variety of heat transfer systems are known in the art, including resistive heating systems, inductive heating systems, Peltier device, evaporative cooling systems, heat pumps, and so forth. These and other thermal management systems may be adapted by one of ordinary skill to heat and/or cool imaging media and provide a thermal controller 548 as described herein, with the selection of a particular system depending on a range of factors such as the rate of heat transfer, the need for cooling and/or heating, the desired temperature range for temperature control, and so forth. It will also be understood that the temperature controller may be used to control a temperature of the imaging medium within the reservoir 508, within the supply 542 of imaging medium, and/or within the pump 544 or other hardware fluidly coupling the reservoir 508 to the supply 542.

In one aspect, imaging hardware 550 may be positioned inside the imaging medium 508. This may, for example, include illumination sources (such as light emitting diodes, lasers, or other sources of broadband or narrowband illumination), cameras, range finders, and the like, any of which may be advantageously positioned inside the reservoir 540 to provide improved positioning for imaging functions, optical distance measurements, and so forth. Where multiple cameras are used, the imaging hardware 550 may be channelized or multiplexed, e.g., by wavelength, for improved resolution, multi-function imaging, and so forth. In one aspect, the membrane 519 may be optically transparent in one set of wavelengths, and the imaging hardware 550 may be configured to capture images of the environment outside of the membrane 519 in that range of wavelengths, which permits optical evaluation of the context around a membrane 519 while in use, e.g., on a robotic end effector or the like, at the same time that quantitative topological data is being acquired at other wavelengths where the membrane 519 is optically opaque. Optical fibers, electrical wires, or the like may be used to control and/or acquire data from each item of imaging hardware 550. In another aspect, some or all of the imaging hardware 550 may be self-powered, with wireless data/control systems so that the imaging hardware 550 can operate within the reservoir 540 without requiring physical connections for power and data.

The imaging hardware 550 may also support shape from motion or similar imaging techniques. For example, where the membrane 519 extends significantly from the containing wall(s) 520 along the axis 517, the membrane 519 may be placed in contact with a target surface and the tactile sensor 502 may be moved about, e.g., moved laterally along the target surface, while the imaging hardware 550 captures images to facilitate extraction of surface information using shape from motion techniques or the like. This may also advantageously facilitate a combination of shape from motion measurements and photometric stereo measurements for a target surface.

In addition to the advantages described above, a fluid tactile sensor can provide numerous practical benefits in different contexts. In one aspect, the use of fluid as an imaging medium provides a broader range of material options and manufacturing options where, e.g., an elastomer gel is inappropriate or impractical. It is also possible to change the volume of the sensor, which permits use in a wide range of volume-sensitive imaging applications. The fluid tactile sensor can also control the normal contact force in a more consistent and/or dynamic manner along a non-planar target surface, which may be useful in a variety of circumstances, particularly where the target surface may include flexible or pliable features. More generally, a fluid tactile sensor permits an explicit and dynamic tradeoff between contact forces and signal quality for tactile sensing applications, e.g., by controlling pressurization of the reservoir 540, in a manner that is not generally possible with a gel.

In one aspect, fluid tactile sensors may be usefully applied in a medical context. For example, the ability to change volume, e.g., by reducing volume for entry through a confined access channel, permits use in minimally invasive medical procedures such as endoscopy or boroscopy, or in medical imaging applications where a relatively large interior volume with concave surfaces, such as a stomach, bladder, heart chamber, or the like, is to be measured. The use of a highly pliable fluid imaging medium can enable improved soft tissue imaging, and with suitable accompanying processing, may provide a robotic substitute for palpitation or other manual exploration by measuring not only shape but also deformation in response to applied pressure. In this latter case, remote medicine may be improved by providing tactile information to a medical professional during a remote health care session, or by providing a more complete force/shape description for a remote surgical robot or the like.

Figure 6:
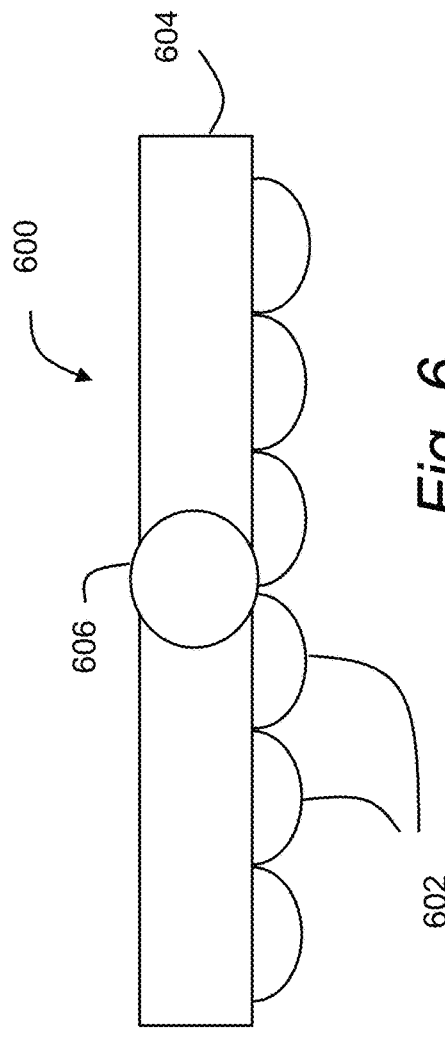
FIG. 6 shows a multi-sensor system.

FIG. 6 shows a multi-sensor system 600. A number of fluid tactile sensors 602, such as any of the fluid tactile sensors described herein, may be attached to a base 604 and used as an aggregate surface sensor. The base 604 may be a rigid substrate, a flexible substrate that conforms to aggregate shape of a contact surface, or an active substrate such as a robotic gripper or the like with a controllable shape and position. In one aspect, the base 604 may have a general shape such as a planar or curved surface. In another aspect, the base 604 may be shaped to match a target surface of interest such as the shape of a manufactured object to be inspected or measured. In this type of multi-sensor configuration, each liquid tactile sensor 602 can advantageously detect local pressure and/or shape, and may optionally control pressurization to support improved imaging performance and/or to acquire dynamic surface data such as responses to varying localized pressure.

The multi-sensor system 600 may include any suitable shape, size, and arrangement of sensors 602. In one aspect, the sensors 602 may be arranged in a two-dimensional array for localized measurements across an extended two-dimensional target surface. The multi-sensor system 600 may also include one or more articulating joints 606 to permit the base 604 to bend and conform to a target surface. This may include passive articulating joints 606, e.g., in a glove or other hand-operated sensing system 600. This may also or instead include passive articulating joints 606 that are spring-biased to a particular orientation or position, such that the base 604, or portions of the base 604, return to a predetermined starting position in the absence of external forces. This may also or instead include one or more actively controlled articulating joints 606 that can be actuated and controlled by a processor or other controller or the like. For example, an active articulating joint 606 may be powered by rotary motors, linear actuators, pneumatic actuators, and the like, along with control wires or other force transfer mechanisms for same, and of which may be used for computerized control of a position of one or more of the articulating joints 606. For example, in one aspect, the multi-sensor system 600 may function as a robotic hand that can detect touch and contact force, while also measuring the shape of objects being contacted, and the accompanying contact force(s), in order to facilitate improved grasping and manipulation of target objects.

In one aspect, the base 604 may include an article of clothing such as a glove or footwear, and individual fluid tactile sensors 602 may be arranged on a surface of the article of clothing to permit measurement of pressure and/or shape of contacted objects. In one aspect, this may include an exterior of a glove, where shape information can be recovered using liquid tactile sensors 602. In another aspect, this may include interior sensors on a helmet or footwear to measure interior contact forces and or deformation for managing safety or comfort. In one aspect, the article of clothing may be instrumented to monitor the position of each sensor 602, in order to permit acquisition of aggregate object shape as well as detailed surface shape on a sensor-by-sensor basis.

In another aspect, the base 604 may be a collapsible base. In this embodiment, the base 604 may be able to hinge, fold, curve, roll, or otherwise reduce in shape and volume for deployment through a fixed-size access channel. For example, this may include a base 604 with one or more fluid tactile sensors 602 that can be flattened and rolled into a small cylinder for insertion through a minimally invasive surgical access channel or other small access route. The reservoir of the one or more fluid tactile sensors 602 may then be pressurized, e.g., using a remote supply of imaging medium coupled to the reservoir through tubing or the like and any of the pumps described herein, to inflate the fluid tactile sensor(s) 602 and cause the base to unroll or otherwise expand into a deployed sensor for use in capturing images. A variety of techniques for collapsing and expanding surgical hardware are known in the art, and may be used to create a fluid tactile sensor 602 that can be deployed through minimally invasive access ports or other similarly constrained environments.

It will be understood that each fluid tactile sensor 602 (for single or multi-sensor configurations) may have a different three-dimensional shape for contacting a target surface, including different two dimensional surface projections shaped as desired for surface coverage, as well as three-dimensional profiles selected for desired range of measurement and conformance to expected target surfaces. In one aspect, different sensors 602 may have a different three-dimensional shapes to facilitate different types of uses and measurements. In another aspect, different bases 604 may have different shapes and arrangements of articulating joints 606 according to expected target surfaces, including for example planar surfaces, spherical surfaces, hemi-spherical surfaces, or compound surfaces adapted to a particular target object, with lenses and cameras arranged accordingly to provide optical access to the contact surface for illumination and imaging. It will be understood that an articulating joint 606, as described herein, may include any moving or moveable mechanical device, or combination of devices, providing sufficient flexibility and degrees of freedom for an intended use.

Figure 8:
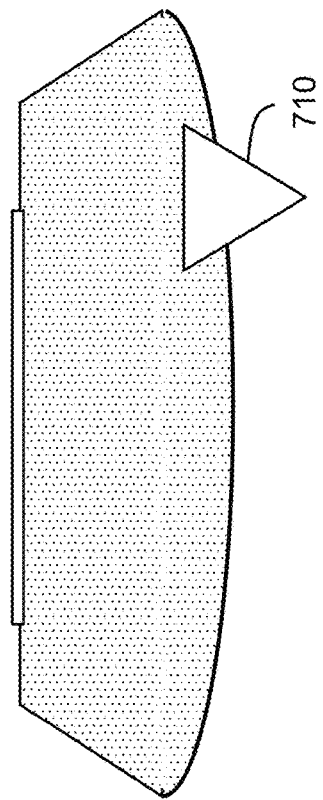
FIG. 8 shows a robotic gripper with an integrated fluid imaging medium.
Figure 7:
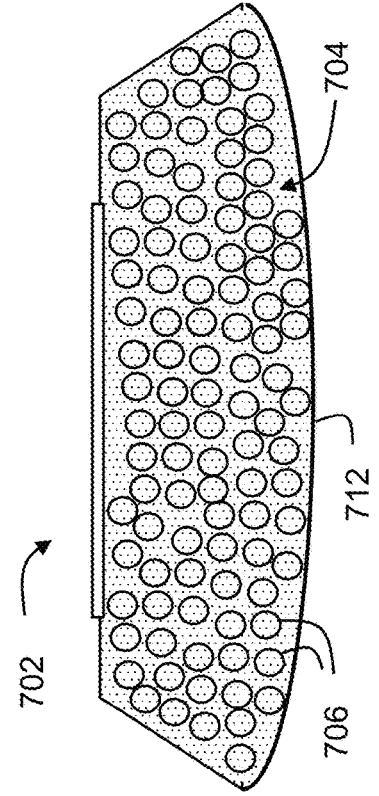
FIG. 7 shows a robotic gripper with an integrated fluid imaging medium.

FIG. 7 and FIG. 8 show a soft robotic gripper with an integrated fluid imaging medium. In general, any of the fluid tactile sensors describe herein may form a gripper 702 using a reservoir with a fluid imaging medium 704 as described herein. In addition to the fluid imaging medium 704, the reservoir may contain a number of beads 706 of optically transparent, transmissive material. The beads 706 may also advantageously be index-matched to the fluid imaging medium 704 so that the reservoir is transparently clear through the beads 706 and the fluid imaging medium 704 during image capture. The beads 706 may be formed, e.g., of any of the rigid, optically clear materials described herein, or any other suitably clear, rigid, and index-matched material.

In this general configuration, the reservoir can be reverse-pressurized by extracting some of the fluid imaging medium 704, causing the beads 706 to move together into frictional engagement with one another so that the reservoir transitions from a more malleable state to a more rigid state. While the degree of malleability and rigidity will vary according to the type of membrane, the size, shape, and distribution of beads, the amount of pressurization, and so forth. However, the malleability of the gripper 702 can generally be increased by increasing pressure until the beads 706 are out of engagement with one another, and can generally be decreased by decreasing pressure until the beads 706 are in greater mechanical engagement with one another. Conversely, the rigidity of the gripper 702 can generally be increased by decreasing pressure until the beads 706 are in engagement with one another, and generally decreased by increasing press until the beads 706 are out of engagement with one another. Any of a variety of shapes and sizes (and/or size distributions) of granular material may be used as the beads 706 to perform this jamming function, according to the desired size and strength of the gripper, and the shape of objects interacting with the gripper 702.

In general, as shown in FIG. 8, the gripper 702 may be placed against an object 710 while the reservoir is pressurized, e.g., expanded in a manner that permits low friction movement and flow of the beads 706 relative to one another. In this configuration, the aggregate shape of the gripper 702 is generally malleable, and the gripper may conform to and surround the object 710. A shape of the object 710 may be imaged through the fluid imaging medium 704 and the beads 706 (which are index matched to the medium 704, and optically transparent in the imaging wavelengths of interest) using any of the techniques described herein. Once the gripper 702 is positioned in contact with the object 710 (and optionally, any desired surface measurements are taken), some of the fluid imaging medium 704 may be extracted from the reservoir to reverse-pressurize the reservoir and jam the beads (not shown in FIG. 8) into mechanical engagement with one another so that the gripper 702 transitions from a relatively soft, flowable state to a relatively fixed state. In this latter, fixed state, the gripper 702 will tend to hold its shape, and may resist deformation sufficiently to support the load of a partially enclosed object such as the object 710, particularly where the gripper 702 sufficiently surrounds the object 710 to occlude a portion of an exit path for the object 710 from the gripper 702. The gripper 702 may then hold on to the object 710 and manipulate the object 710, e.g., by picking up the object and moving the object to a new location, or otherwise interacting with the object. In this context, the load bearing capabilities will depend on the shape of the object 710, the frictional engagement between the object 710 and the gripper 702, the degree of reverse-pressurization, and other mechanical parameters such as the shape and number of beads 706 and the strength of a membrane 712 for the gripper 702.

According to the foregoing, in one aspect, a system described herein may include a processor configured by computer executable code to perform the steps of: pressurizing a reservoir such as any of the reservoirs described above with an imaging medium to increase a malleability of the fluid tactile sensor, positioning the fluid tactile sensor on an object with a robotic handler, and gripping the object by depressurizing the reservoir to remove a portion of the imaging medium and increase a rigidity of the fluid tactile sensor over a surface engaged with the object. In one aspect, the processor may pressurize and pressurize to predetermined pressure targets. In another aspect, the processor may sense volume, object movement, shape and extent of engagement between object and membrane, or any other useful properties, and variably control pressurization and depressurization to achieve improved gripping and release.

The reservoir may be subsequently re-pressurized to release the object 710. In general, images and surface reconstructions may be obtained throughout these transitions from rigid to flowable states. However, where larger beads are used, reverse pressurization may draw regions of the membrane away from the target surface and into the beads, interfering with imaging resolution. More generally, the distribution of shapes and sizes for the beads 706 may affect gripping performance, flowability, and imaging resolution, and may be optimized in various ways according to an intended use.

It will be understood that other soft gripping technologies with pliable membranes are also known in the art, and may be geometrically formed as e.g., cups, tori, or the like. These other techniques may also be adapted for use with a fluid tactile sensor as described herein to provide an actuator with a combination of three-dimensional, contact-based, surface imaging and controlled gripping. In addition to capturing surface shape information, an evaluation of contact surfaces for a soft gripper may provide information about slippage (e.g., based on change of shape, location, or pressure field of a gripped object), loss of suction/seal (based on vacuum measurement of a contained volume of air), or the like, which may be used as feedback to control robotic actuation, and to determine, e.g., when to release and re-acquire an object.

According to the foregoing, there is disclosed herein a system comprising a reservoir having a surface bounded by a flexible membrane; an optically transparent imaging medium within the reservoir; a plurality of granules within the reservoir, the granules formed of an optically transparent material index matched to the optically transparent imaging medium within the reservoir for at least one range of wavelengths; and a pressurization system configured to control an amount of the optically transparent imaging medium within the reservoir. The pressurization system may be controllable e.g., with a processor configured by computer executable code to operate the pressurization system and/or a robotic handler coupled to the reservoir, to perform a soft robotic gripping function with the flexible membrane. This may include automatically or manually maneuvering the flexible membrane with the robotic handler to be in contact with a target object, and then automatically or manually removing a portion of the optically transparent imaging medium from the reservoir with the pressurization system in order to mechanically secure the target object with a surface of the flexible membrane. The system may also or instead include an imaging system configured to capture an image of the flexible membrane through the reservoir within the at least one range of wavelengths.

FIG. 9 shows a method for using a fluid tactile sensor. Although the fluid tactile sensor may be used in fully manual tactile sensing applications, the increased flexibility, as described in the examples above, permit various forms of data acquisition, computer control, and manipulation that cannot be achieved with other sensors. A variety of useful applications of a fluid tactile sensor are described by way of non-limiting examples with reference to FIG. 9. It will be understood that in the following method 900, steps may be omitted, repeated, modified, or rearranged in various ways depending on a particular usage context for a fluid tactile sensor. It will also be understood that various steps described below may be performed by, or caused by, computer executable code stored in a non-transitory computer readable medium when executing on one or more computing devices. In this context, it will also be appreciated that different steps may be performed by different processors, such as where control of the fluid tactile sensor is maintained by a local processor or microcontroller, and where image processing is performed remotely by one or more compute instances in a remote cloud-based computing environment. Similarly, systems described herein may include one or more processors or other computing devices configured by such computer executable code to perform the corresponding steps. All such variations are intended to fall within the scope of this disclosure.

As shown in step 902, the method 900 may begin by engaging a fluid tactile sensor with a target surface. In one aspect, this may include manually placing a fluid tactile sensor in contact with an object, e.g., using a handheld sensing system or the like. In another aspect, this may include computer-assisted positioning of a sensor, such as by manually steering a fluid tactile sensor into engagement with the object using a robotic handler. This may also or instead include directing a robotic handler to automatically locate an object and/or steer the fluid tactile sensor into appropriate engagement with the object, e.g., by identifying and contacting a suitable target surface for additional action.

As shown in step 904, the method may include sensing a parameter associated with imaging the target surface. This may include acquiring image data. This may also or instead include acquiring data using any of the other sensors described herein. For example, this may include sensing a surface temperature (or temperature field) for a target surface, or a temperature of an imaging medium that fills a reservoir adjacent to the membrane of the fluid tactile sensor. This latter temperature may be measured, e.g., within the reservoir, within a supply of the imaging medium outside the reservoir, and/or at one or more other locations. In another aspect, sensing a parameter may include sensing a pressure of the imaging medium within the reservoir. This may be useful to extract pressure or normal force data that characterizes the amount and distribution of force applied to the target surface of an object. This may also or instead be used to control bulk elasticity of the fluid tactile sensor, which may affect resolution of surface data, deformation of the target surface, or other aspects of the imaging environment and data acquisition. In another aspect, this may include measuring a volume of the imaging medium in the fluid or the like. In addition to temperature, pressure, and volume, sensors or sensing systems may be deployed to measure, e.g., thickness of the membrane, deformation of the membrane, electrical characteristics of the membrane, and so forth, any of which may be used to augment the use of a fluid tactile sensor as described herein.

As shown in step 906, the method 900 may include controlling a parameter associated with imaging the target surface. This may generally include controlling temperature, pressure, volume, and the like as described above. Other features might also usefully be observed and controlled, such as the viscosity of the imaging medium. This may also or instead include controlling illumination, data acquisition, focus, and other properties associated with image capture for three-dimensional reconstruction. This may also or instead include controlling position of a robotic handler, or any other parameter or output that might usefully be controlled for the imaging applications described herein.

As shown in step 908, the method 900 may include acquiring image data. This may generally include imaging using any of the techniques described herein, and may include controlling, e.g., focus, illumination, and the like as described herein to support such imaging. In another aspect, this may include selecting imaging parameters such as data rates, imaging modality, and so forth, which may be controlled automatically based on known or observed properties of the target surface (e.g., z-axis range, feature size, etc.). Where non-optical data is available, e.g., for a temperature field or the like, this data may also be captured and stored with image data to support additional processing. For example, surface temperature may provide useful information in detecting certain electrical or mechanical malfunctions, performing medical examinations, and so forth, and may be used to augment visual data for intelligent sensing applications using fluid tactile sensors.

In one aspect, images may provide location-specific data for the target surface. This may, for example, include temperature data, moisture data, pressure data, or the like, e.g., where the membrane is treated with a surface having optical properties that vary based on corresponding physical properties of the target surface that the membrane contacts. Thus, for example, using a suitably configured membrane, the image data may include a two-dimensional temperature field for the target surface, a pressure field (e.g., based on optically detectable local deformation of the membrane, humidity or moisture contact, and so forth. These supplemental data sets may also or instead be acquired by supplemental hardware. For example, an infrared camera may be directed toward the membrane and used to measure a spatial temperature field. Other types of measurements may also or instead be captured.

In one aspect, surface friction may be measured. To obtain this type of measurement, a shearing or sliding force may be applied to the imaging system (after making contact with a target surface) in a direction tangential to the target surface. The amount of displacement and shearing occurring locally in the membrane (e.g., where the membrane varies optically based on deformation, or based on a pattern or the like on the membrane), along with a normal force measurement, can provide data to calculate a coefficient of friction of the target surface. Similarly, an elastic membrane may be pressurized or inflated, and similar techniques can be used to detect sliding along edges where the elastic membrane expands outward along the perimeter of the target surface contact area.

As shown in step 910, the method 900 may include processing image data. In general this may include processing any data acquired through the systems described herein, and extracting information such as quantitative topological data. This may also or instead include the extraction of pliability data or other mechanical properties of the target surface, which may be measured or inferred based on responses of a target surface to different amounts and directions of contact force.

As shown in step 912, the method 900 may include taking additional actions. This may include presenting data, such as by displaying images of a target surface based on, e.g., quantitative surface data acquired by one or more fluid tactile sensors. In another aspect, this may include adjusting imaging parameters or other controllable parameters of the imaging system based on measurements. This may also or instead include changing imaging modalities, selecting different imaging mediums, selecting different fluid tactile sensors with different membranes, or the like. This may also or instead include performing additional processing such as object identification using machine learning, decision making, e.g., for a manufacturing or testing facility, or controlling operation of a robotic actuator that is gripping an object based on tactile feedback from one or more fluid tactile sensors in contact with the object.

These and other steps may be repeated as necessary or helpful for a particular imaging or control application. More generally, unless specifically stated otherwise, the various features and techniques described herein may be used alone or in any suitable combination without departing from the scope of this disclosure.

The above systems, devices, methods, processes, and the like may be realized in hardware, software, or any combination of these suitable for a particular application. The hardware may include a general-purpose computer and/or dedicated computing device. This may include realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X may include any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system comprising:
   a fluid tactile sensor including:
      a substrate, the substrate formed of a rigid material and the substrate including a window of optically transparent material,
      a membrane, the membrane formed of a flexible, elastic sheet of a material, and the membrane having a surface, wherein the membrane is an opaque, reflective membrane with a predetermined reflectance suitable for supporting topographical imaging of the membrane independent of optical properties of a target surface,
      a reservoir having a volume contained at least in part within the substrate and the membrane, and
      an imaging medium within the reservoir, the imaging medium including an optically transparent fluid; and
   an imaging system including:
      an illumination source directed through the window of the substrate toward the surface of the membrane when the membrane is positioned for use within an imaging volume of the imaging system, and
      an imaging device positioned to capture images of the surface of the membrane through the window of the substrate when the membrane is placed for use within the imaging volume of the imaging system.

2. The system of claim 1, further comprising a processor configured by computer executable code stored in a memory to acquire images from the imaging system and to calculate a quantitative surface topography of the target surface contacting the membrane.

3. The system of claim 1, wherein the illumination source includes a structured light source.

4. The system of claim 3, wherein the structured light source creates a three-dimensional illumination pattern within the imaging volume of the reservoir.

5. The system of claim 1, further comprising a cartridge housing the fluid tactile sensor, the cartridge removable from and replaceable to the imaging system.

6. The system of claim 1, further comprising one or more containing walls mechanically coupling the membrane to the substrate.

7. The system of claim 1, wherein the window includes at least one of a glass, a polycarbonate, an acrylic, a polystyrene, a polyurethane, or an optically transparent epoxy.

8. The system of claim 1, wherein the window has a first index of refraction matched to a second index of refraction of the imaging medium within the reservoir.

9. The system of claim 1, wherein the imaging medium includes at least one of a gas and a liquid.

10. The system of claim 1, wherein the membrane is formed of an elastic polymer.

11. The system of claim 1, further comprising an optical pattern on the membrane visible to the imaging device of the imaging system through the window.

12. The system of claim 1, wherein the illumination source includes at least one of a laser and a light emitting diode.

13. The system of claim 1, wherein the imaging system uses two or more imaging modalities including at least one of photometric stereo imaging, multi-view stereo imaging, structured light imaging, and focus stacking.

14. The system of claim 1, further comprising a pressure sensor coupled to the reservoir and configured to measure a pressure of the imaging medium within the reservoir.

15. The system of claim 1, wherein the membrane has an optically reflective coating.

16. The system of claim 1, wherein the membrane has a patterned surface.

17. The system of claim 1, wherein the membrane has an exterior surface facing away from the window, the exterior surface including a friction-reducing coating.

18. The system of claim 1, wherein the window includes one or more light shaping features for at least one of filtering, polarizing, focusing, or diffusing light passing through the window.

19. The system of claim 1, wherein the imaging system includes a diffractive optical element positioned to create a three-dimensional illumination pattern from the illumination source within the imaging volume.

20. The system of claim 1, wherein the imaging device includes one or more of a photometric stereo imaging system and a triangulation-based 3D reconstruction system.

* * * * *